US005632589A

United States Patent [19]
Bray et al.

[11] Patent Number: 5,632,589
[45] Date of Patent: May 27, 1997

[54] APPARATUS FOR CENTRALIZED MECHANICAL AND SYSTEMS CONTROL IN A MATERIAL HANDLING SYSTEM

[75] Inventors: Thomas J. Bray, Saline; Kenneth E. Burkhalter, Chelsea; Ron Cailey, Elk Rapids, all of Mich.

[73] Assignee: Symorex, Inc., Ann Arbor, Mich.

[21] Appl. No.: 176,383

[22] Filed: Jan. 3, 1994

[51] Int. Cl.$^6$ ................................................ B65G 47/46
[52] U.S. Cl. ................ 414/339; 198/349.6; 198/370.04
[58] Field of Search .................................. 198/365, 802, 198/349, 341, 349.5, 349.6, 350, 370.04; 414/339, 349, 222

[56] References Cited

U.S. PATENT DOCUMENTS

| | | |
|---|---|---|
| 8,166 | 6/1851 | Griggs . |
| 65,788 | 6/1867 | Allen . |
| 353,714 | 12/1886 | Shaw . |
| 850,804 | 4/1907 | Steffee . |
| 1,893,633 | 1/1933 | Peterson et al. . |

(List continued on next page.)

FOREIGN PATENT DOCUMENTS

| | | |
|---|---|---|
| 54138273 | 10/1979 | Japan . |
| 2197633 | 5/1988 | United Kingdom . |

OTHER PUBLICATIONS

Dallas Semiconductor pp. 12–14 to 12–18.
Product Focus – Smart Buttons: A New Method of Auto. ID, p. 29.
"This Is Not Your Father's Material", pp. 52–53.
Industrial Equipment News, Nov. Spotlight.
"Trains of trays: a new approach to conveying" p. 85.
Product News "The Upside–Down SPM", Feb. 1992.
NovaSort brochure.
ValuGuide, pp. 5.0A–5.0B.
Amer Bearing and Power Transmission.

*Primary Examiner*—Joseph E. Valenza
*Attorney, Agent, or Firm*—Young & Basile, P.C.

[57] ABSTRACT

A material handling and transport system for transporting goods between a number of discharge/induction stations and selectively receiving and discharging goods at the stations. A moving transport unit, for example a train-type string or cars or trolleys with tilting trays for receiving, transporting and discharging goods between induction and discharge stations positioned along a track, incorporates a number of self-contained, locally controlled sensing, signal and actuation devices which allow the trolleys to selectively interact with passive stations around the track. The centralization of systems control on the trolleys themselves, as opposed to on the track-side stations, results in greater system flexibility, reduced cost, and allows the train to operate in essentially autonomous mode without the need for external control and monitoring. In one embodiment each tray-supporting trolley includes a self-actuating tipper arm mechanism activated by local computer to engage discharge station as the trolley passes to discharge the load carried by the trolley. Each trolley also includes a sender/receiver device capable of reading passive status indicators associated with stations around the track, and signaling various switching devices to activate track-side structure for interaction with the trolley as it passes.

13 Claims, 16 Drawing Sheets

U.S. PATENT DOCUMENTS

| | | | |
|---|---|---|---|
| 3,050,168 | 8/1962 | Kemp | 194/10 |
| 3,167,192 | 1/1965 | Harrison et al. | |
| 3,360,106 | 12/1967 | Harrison et al. | |
| 3,510,014 | 5/1970 | Speaker et al. | |
| 3,528,374 | 9/1970 | Wickens | 105/182 |
| 3,544,788 | 12/1970 | Guzik | 246/63 |
| 3,648,617 | 3/1972 | Metzner et al. | 104/94 |
| 3,749,025 | 7/1973 | Giraud | 104/25 |
| 3,777,548 | 12/1973 | Nicolaides | 73/12 |
| 3,845,721 | 11/1974 | Wagner | 104/148 |
| 3,863,781 | 2/1975 | Butzow et al. | |
| 3,865,226 | 2/1975 | Scata | |
| 3,886,869 | 6/1975 | Tantlinger | 104/147 |
| 3,974,909 | 8/1976 | Johnson | |
| 4,027,840 | 6/1977 | Blair | 246/122 |
| 4,063,655 | 12/1977 | Lambert | 214/62 |
| 4,063,656 | 12/1977 | Lambert | |
| 4,065,007 | 12/1977 | Kurahashi | 214/62 |
| 4,089,404 | 5/1978 | Venzke | 198/365 |
| 4,174,773 | 11/1979 | Venzke | 198/365 |
| 4,635,785 | 1/1987 | Prydtz | 198/365 |
| 4,722,430 | 2/1988 | Canziani | 198/365 |
| 4,724,965 | 2/1988 | Willberg | 209/573 |
| 4,726,464 | 2/1988 | Canziani | 198/365 |
| 4,735,383 | 4/1988 | Corrie | 246/3 |
| 4,794,866 | 1/1989 | Brandis | 104/292 |
| 4,856,642 | 8/1989 | Nicholson et al. | 198/365 |
| 4,860,662 | 8/1989 | Matsumoto | 104/93 |
| 4,912,471 | 3/1990 | Tyburski et al. | 342/42 |
| 4,921,087 | 5/1990 | Nakamura | 198/350 |
| 4,974,259 | 11/1990 | Takahashi et al. | 455/39 |
| 5,018,928 | 5/1991 | Hartlepp | 414/339 |
| 5,019,815 | 5/1991 | Lemelson et al. | 340/933 |
| 5,069,141 | 12/1991 | Ohara et al. | |
| 5,102,281 | 4/1992 | Handke | 414/296 |

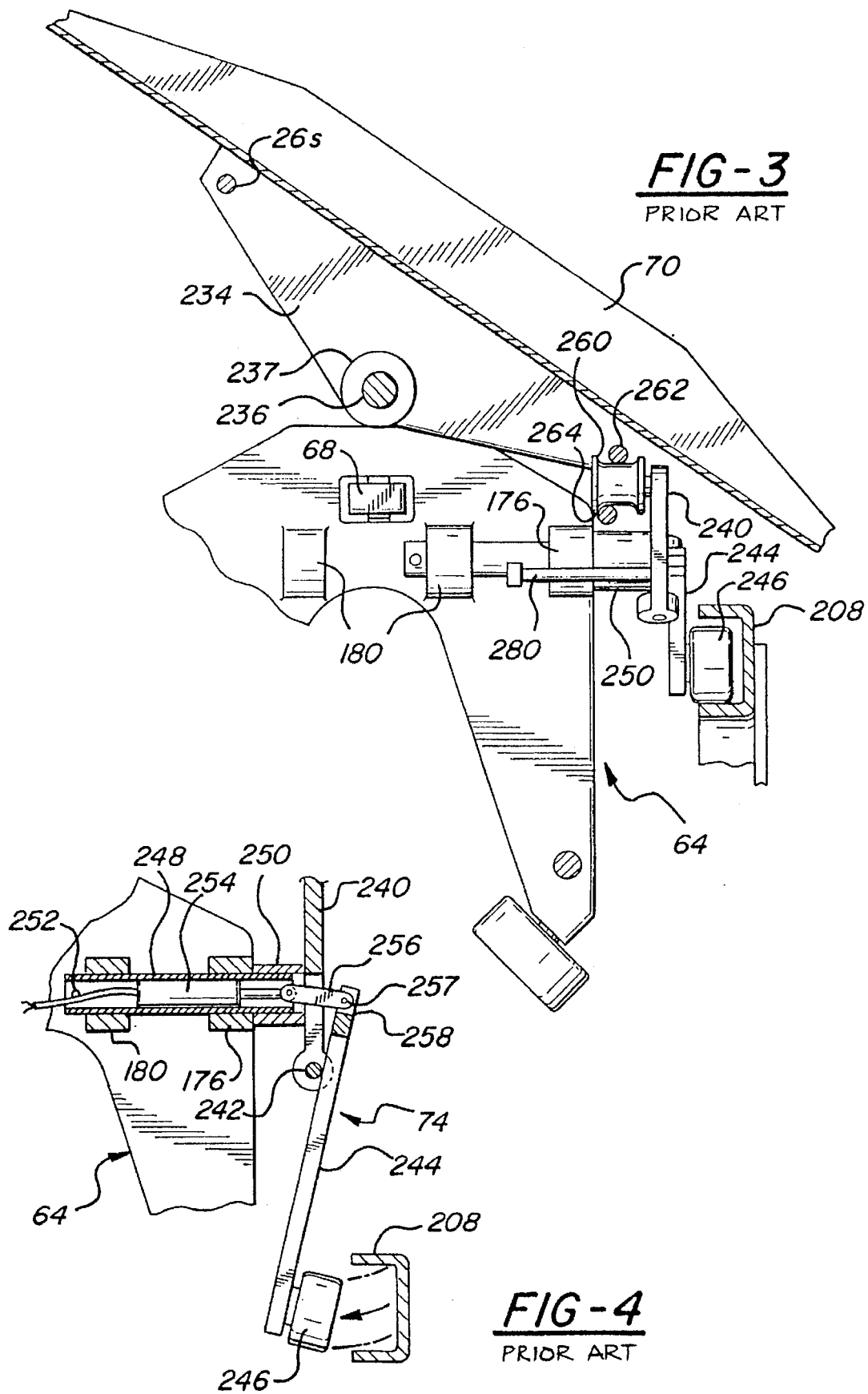

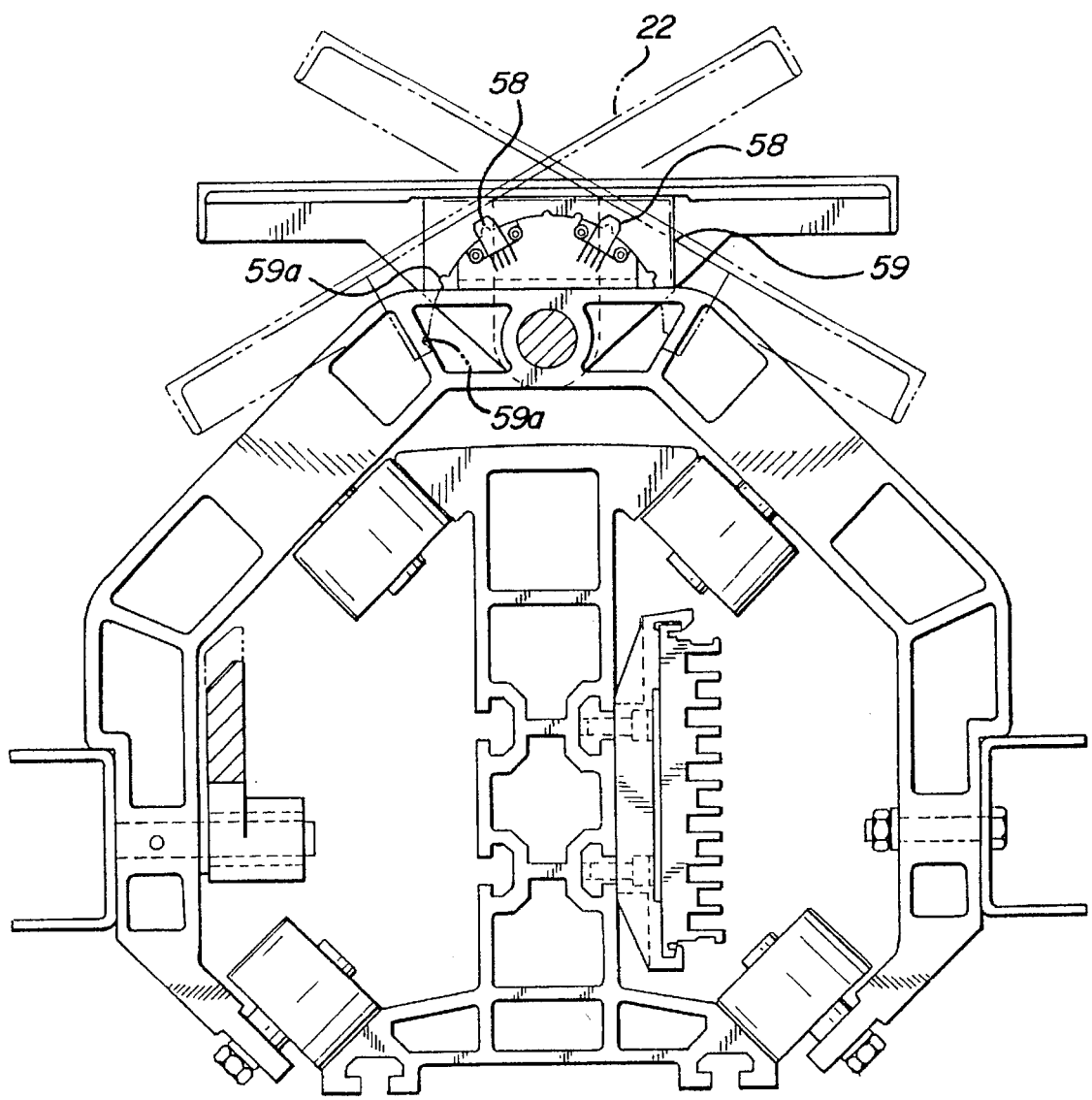

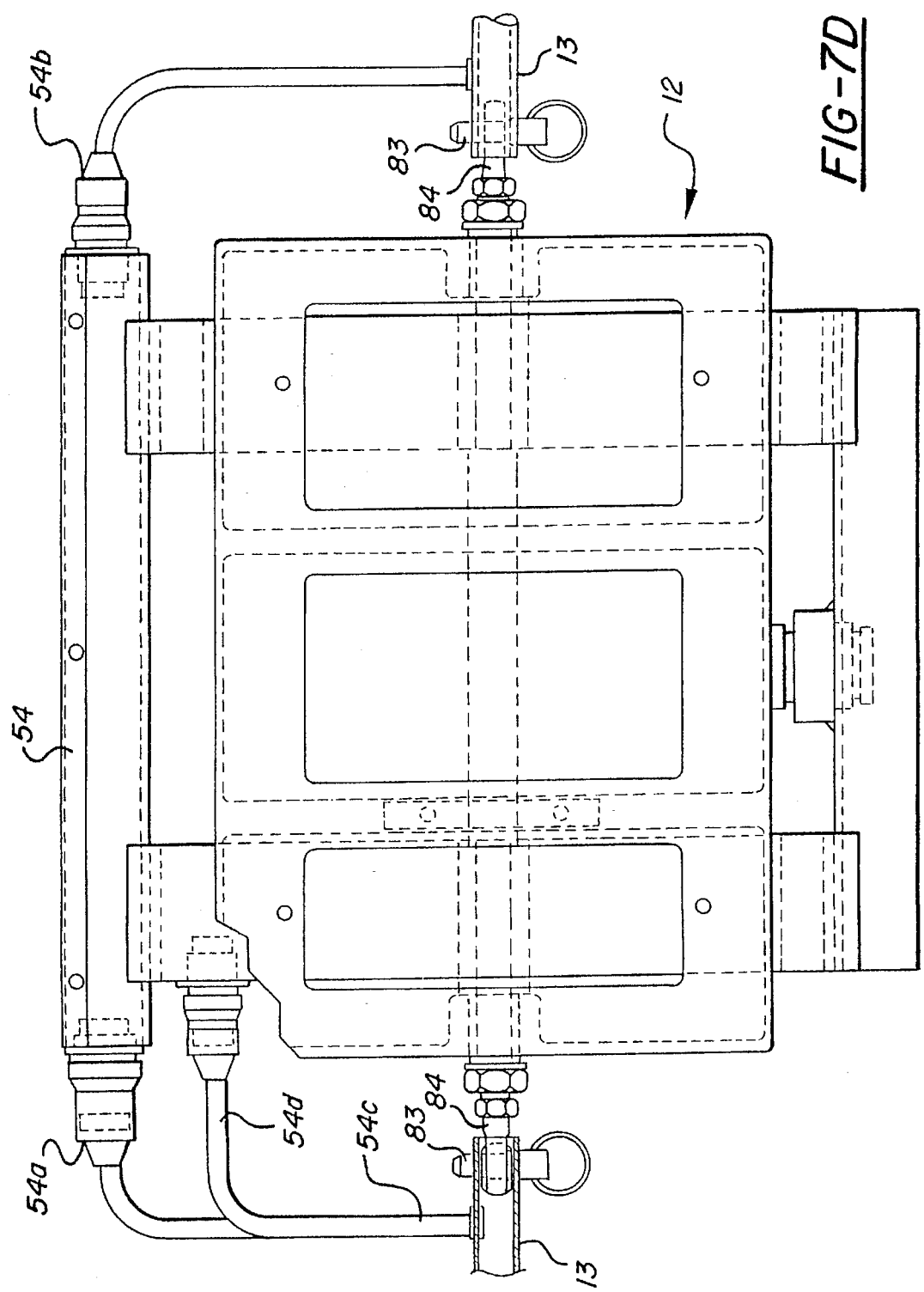

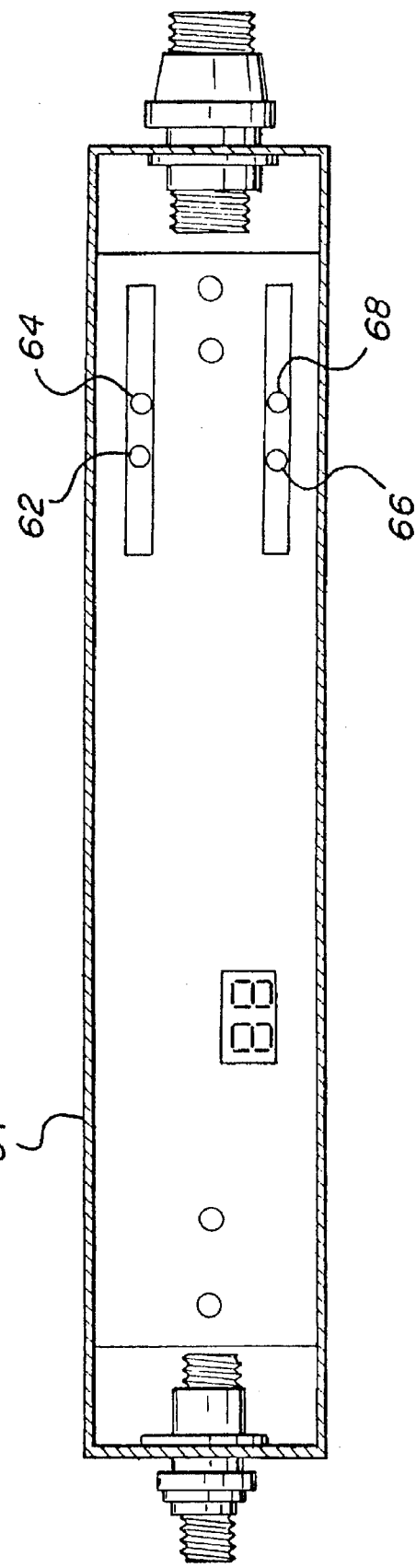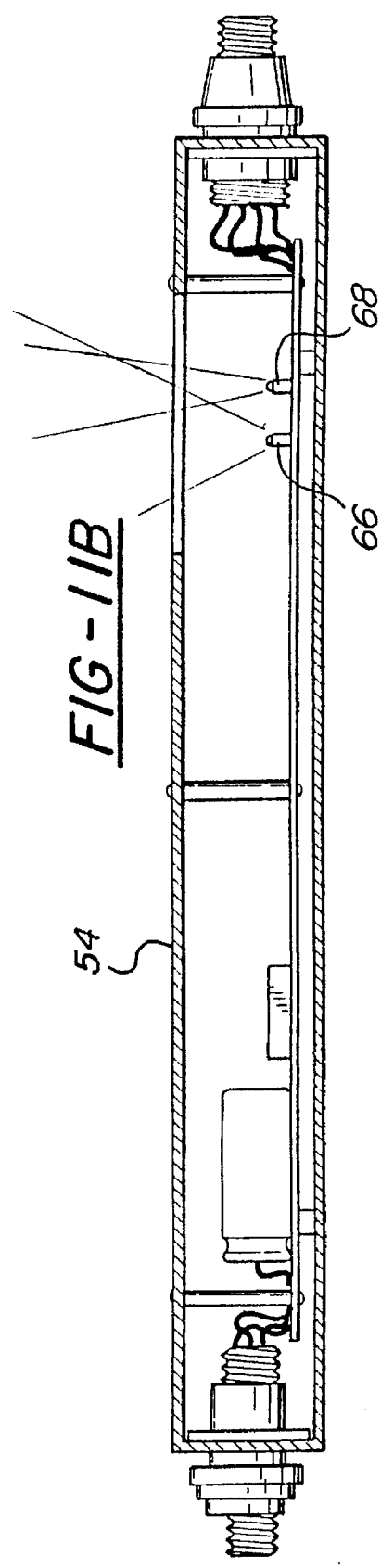

APPARATUS FOR CENTRALIZED MECHANICAL AND SYSTEMS CONTROL IN A MATERIAL HANDLING SYSTEM

FIELD OF THE INVENTION

The invention is generally related to automated material handling utilizing one or more train-type guided vehicles transporting goods between discharge and induction stations in a sortation system.

BACKGROUND OF THE INVENTION

Automated material handling and sortation systems are known for receiving, transporting and discharging goods among various stations in large scale sortation operations, for example warehousing, distribution, postal sortation and handling of mail and packages, and airport baggage handling, to name a few. Whatever the operation, goods typically originate from one location within the facility and must be sorted and transported to several different locations for further handling, or originate from several locations within a facility and must be transported to a single location such as a shipping dock. The manner in which the goods are sorted and selectively distributed among various stations in a facility of course depends on the nature of the operation.

One known sortation and delivery method involves using powered belt or roller conveyers to transport individual items or sorted loads of items to various destinations within a facility. When goods from multiple sources must be delivered to a single station, associated take away conveyors must be merged onto a main conveyor or discharge point. This requires careful coordination of each item as it arrives to prevent jams or damage. Each merge point on such a conveyor system would accordingly require a complex system of sensors, start/stop controls, actuators, power supply lines, etc. Similarly, when items must be delivered to multiple destinations or stations in a facility, a main conveyor must be provided with diverter apparatus to direct individual items or batches of items to either continue or be diverted at various points. Each diverter apparatus would require an additional closed system including sensors, actuators, control mechanisms, wiring and power supply to accomplish the diverting operation and track and identify the items being diverted.

The disadvantages of conveyor-type systems have led to the development of tracked systems. In one known type of system, a closed loop track carries cars propelled by a continuous belt or chain drive. The cars are equipped with open trays which can be loaded from chutes, and subsequently tilted to unload their carloads into bins which are located around the track. These cars are often termed "dumb" because they do not initiate any sorting actions, but rather respond to stimuli from the induction stations to discharge their load. For example, car speed is controlled by a track-side motor which circulates the belt or train drive, and car dumping is controlled by track-side dumping mechanisms. Such systems are designed for long term installations which sort and transport large volumes of goods. Although these closed loop track systems are an improvement over conveyor-type systems, the complexity of their track, drive and tilting mechanisms makes it a major undertaking to set them up or rearrange their sortation layout. They must be shut down for nearly all maintenance tasks.

An improvement over continuous belt or chain drive closed loop track systems is disclosed in U.S. Pat. No. 5,018,928 to Hartlepp. Hartlepp discloses a train-type automated track sortation system, including a number of "smart" cars and a locomotive or tug for pulling the cars around the track between various discharge and induction stations. The cars on the train are loaded with goods to be sorted or delivered and given destination addresses for the goods at an induction or loading station. Once a train has left the loading station, functions such as keeping track of position, regulating speed and dumping cars are controlled by a microprocessor placed aboard each locomotive. This design allows the track to be simplified as it need only provide a path and power supply for the train (or trains) running between discharge stations positioned along the track. There is accordingly no drive train, drive motor or track-side dumping control mechanisms with attendant wiring required. The track design allows new track configurations to be made up by simply adding track switches, added track sections and discharge stations. Sorting capacity can be varied by adding or subtracting cars to a train in accordance with the capacity of the loading station, or by changing the number of trains operated on a track. It is also possible to perform many maintenance tasks by removing individual cars or trains from the track, leaving the rest of the system intact and operating.

The Hartlepp cars utilize a mechanical tipping mechanism with a computer-controlled tipping arm selectively activated to engage off-track tip actuating structure to initiate a discharge at a discharge station when the train passes. This occurs while the car and train are moving. As a car with a load to be discharged passes the appropriate discharge station, the tipping mechanism is activated to engage an actuator on the track to tilt a tray carrying the load to either side of the track where the discharge station is located.

Despite the advantages of the Hartlepp apparatus over conveyor-type and belt- or chain-driven track systems, there are some drawbacks. The Hartlepp system requires frequent communication between a central off-track computer which monitors and controls induction and discharge operations, and the train. Goods are received by the train at a "master" loading station with centralized PLC control. Destination information is fed from the central computer to the locomotive, which dumps packages from each car at the appropriate discharge stations. Since loading and discharge of packages to and from the cars on the train is centrally monitored and controlled by a host computer's instructions to the locomotive and induction stations, there is no communication between the induction and discharge stations and the train. If events at the stations would prevent a proper induction or discharge, or if the central computer's tracking of the items and station capacity is incorrect, or if the central computer is "down", there is no way for the train to accurately monitor and control its own operations with track-side devices on a local level. This can result in discharge malfunctions, overloaded trains, damage to packages or items being sorted, and general loss of control over the system.

SUMMARY OF THE INVENTION

The present invention provides a method and apparatus for material handling which centralizes mechanical systems and control on a moving transport means, such as a train-type sortation apparatus. The moving transport means controls "train-side" and "track-side" intermediate operations with its own local intelligence, control systems and sensing/signalling devices. While the operation of the system can be optimized through use of a central dispatch or control computer and "smart" track-side systems, the system of the present invention is capable of operating in an autonomous mode in which it locally controls, activates and signals its own onboard systems and passive or "dumb" track-side systems, for example to monitor and regulate induction, and discharge, or track, switching operations.

This is generally accomplished with a train-type transport means comprising a locomotive or tug unit pulling one or more cars or trolleys along a predefined path between induction and discharge stations, for example a track. Each car or trolley is provided with a stable platform or tray means for receiving and discharging items from and to various stations, and for carrying the items in a stable fashion between stations. In a preferred embodiment the platform is a tilting tray which can be tipped to either side of the trolley in a selective manner. Alternatively, the platform could include a powered cross-belt or other suitable mechanism to discharge items from the trolley.

Each trolley is also provided with a discharge mechanism which operates the tilting tray between various discharge, induction and receiving positions. The discharge mechanism is controlled from the local intelligence on the tug, and can be set for various modes of operation, one of which cooperates with passive track-side structure near a discharge location to tip or tilt the tray in an appropriate manner and effect a discharge of the items carried thereby.

In a further embodiment of the present invention, each trolley is provided with signaling and/or sensing means which signals track-side systems such as induction stations and/or senses or "reads" the status of track-side systems such as discharge stations as the train approaches. The signalling and sensing of the availability of these track-side systems is accomplished individually for each load-supporting trolley, and without having to rely on track-side or remote centrally-controlled systems such as a central dispatch computer monitoring the status of the track-side systems and train operations. Instead, the signal and sensing means on each trolley monitor and/or control "dumb" or passive indicators and switches associated with the stations as the train passes.

In one embodiment the sensing means on the trolleys comprise active photosensitive receiver means, such as an infrared receiver, which senses or "reads" the availability of an upcoming discharge station depending on whether a station-side available indicator is on or off. The station-side availability indicator can be a simple, passive device which normally provides an "available" signal unless the discharge station is full. The availability indicator is preferably switched off by a passive, package-operated switch arrangement. In a preferred form the discharge sensing means comprise both a sender and receiver mechanism on each trolley which determines the status of an upcoming discharge station, and which can further be used to signal track-side devices such as induction stations or track switches.

In an alternate embodiment of the invention, the discharge actuating mechanism can itself be used to signal track-side systems, for example tray availability as the train nears an induction station.

In a further embodiment of the invention a novel discharge mechanism and actuating means is disclosed, comprising two independently activated tipper arms on each trolley, controlled by local computer means on the trolley or the tug to engage a passive track-side ramp structure which acts through the tipping arm and discharge mechanism linkages to tilt or tip the tray on the trolley and discharge its load. A novel tipping ramp and dual tipping arm arrangement is shown which permits tipping of the tray to both sides of the track with a single ramp structure, the tipping direction depending on which tipping arm is actuated. The novel tipping ramp structure also provides a long, smooth cam force to the tray through the tipping arm as the trolley passes to ensure a smooth, positive discharge.

Each trolley or car further includes tray position sensing means to monitor induction and discharge of packages or goods from the trolley. For example, photocell means can be mounted to sense whether a tray is locked flat in a load carrying position, is tipped fully left or right, or is in transition between these positions.

The novel provision of train- or trolley-based sensing, signaling and actuating mechanisms which monitor and control all of the activities and data needed for operations between the train and interactive track-side mechanisms such as track-switching induction and discharge. This results in a simplified, flexible, more reliable system capable of functioning autonomously, without the need for track-side monitoring or control of train operations (induction, discharge, track-switching). This in turn results in greatly increased system flexibility, reduces cost, and allows for a significant degree of autonomous operation.

These and other advantages of the present invention will become apparent upon a further reading of the specification.

BRIEF DESCRIPTION OF THE DRAWINGS

FIGS. 1–5 are schematic representations of a train-type track sortation and material handling system according to the prior art;

FIGS. 7A–7D are end and plan views of the trolley car of FIG. 6;

FIGS. 11A–11B are front and plan views of the availability detection mechanism of FIG. 10;

DETAILED DESCRIPTION OF THE PREFERRED EMBODIMENT

Figure 1:
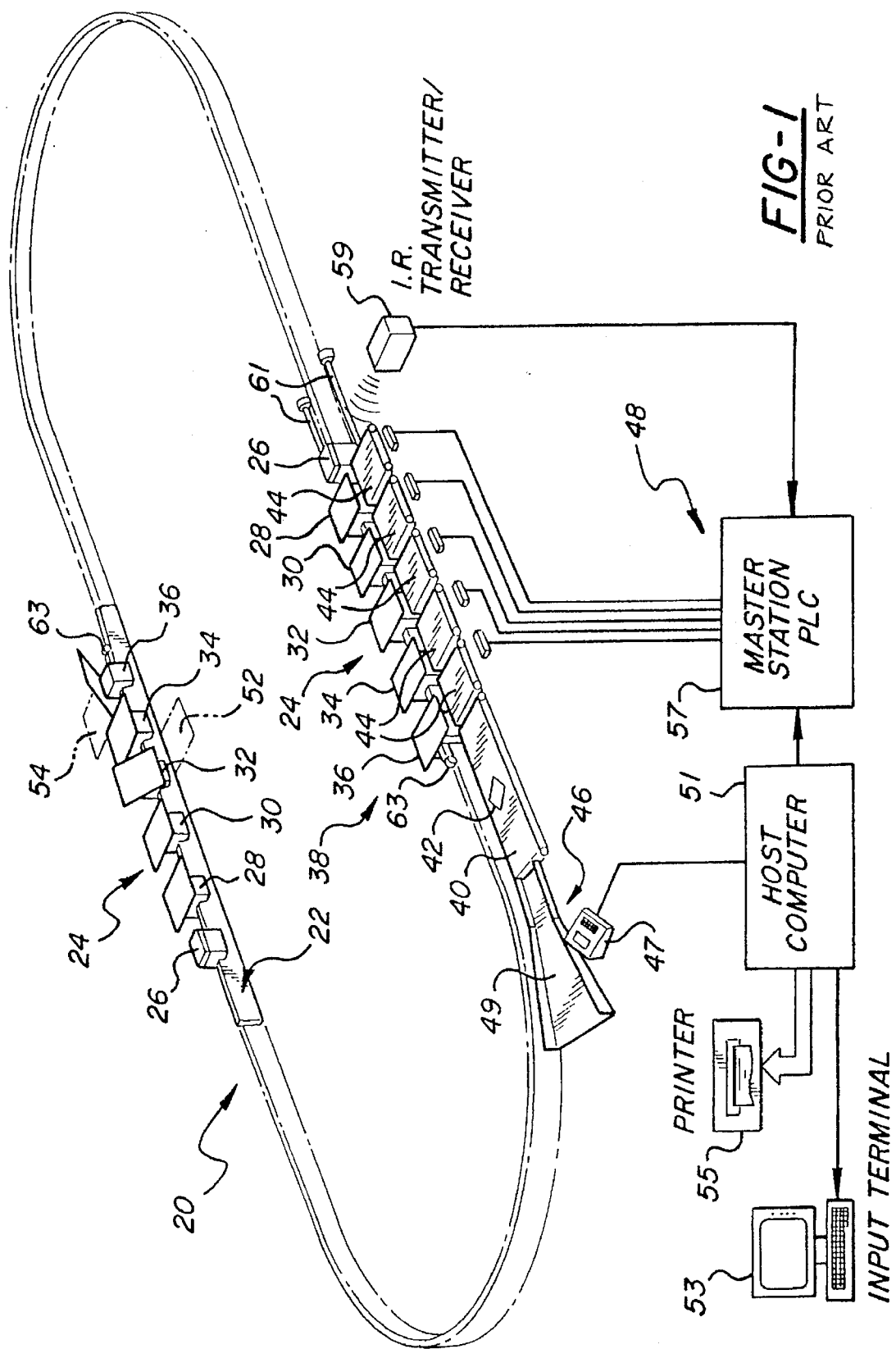

Referring to FIG. 1, a prior art train-type, closed loop track sortation and material handling system is shown schematically. FIG. 1 provides a simplified background illustration of the general nature of a closed loop train and track type sortation system. The prior art track sortation system 20 of FIG. 1 includes a closed loop track 22 in which a train-type transport mechanism 24 rides between a master or loading station 38 and a number of slave stations 52,54. Train 24 includes a locomotive 26 and trailing cars 28,30, 32,34,36. Power is provided from the track forming the loop 22 to the locomotive 26 to drive the train around the loop.

The train originates from a master or loading station 38 which typically includes a loading conveyor 40 for delivering packages or loads 42 to positions where the packages are moved by loaders 44 onto the car simultaneously. As the package moves along the conveyor it passes a station 46 linked to a control system 48 which also operates the loaders 44. Information about the addresses of the packages entered into a keyboard 47 in the order in which the packages leave a chute 49. The packages then travel via the conveyor 40 onto the loaders 44 which pass the packages along and place them on to a loader. The information about the packages is fed to a host computer 51 which has been programmed using an input terminal 53 which has a printer 55 for providing hard copies. Data from the host computer is used by a programmable logic circuit (PLC) 57 to activate the loaders 44 and to provide a signal for transmission by an infrared transmission/receiver 59 which is directed towards the locomotive 26. The loaders 44 place the packages on the trays of the stopped train as instructed by master station PLC 57, and the information about the addresses for the individual packages is transmitted from the infrared transmitter/receiver 59 to a similar unit on the locomotive 26. Under instructions from the PLC, the newly-loaded train begins to move using a combination of a motor and a control mechanism 61.

The information provided to the locomotive by the transmitter/receiver 59 is used to unload the packages at the destination such as slave stations 52,54. As seen in FIG. 1, these stations are receiving mail from respective cars 32 and 36 to opposite sides of the track. There can be more slave stations around the loop and only two are shown for the purposes of simplicity of drawing. Also, the stations may be separated by significant distances rather than being separated by a distance less than the length of the train as illustrated in FIG. 1. The train controls the dumping using fixed equipment at the slave stations.

The position of the train on the track is determined by an onboard logic circuit using signals from a friction-driven encoder 63 which runs on the track.

After the train has run around the track and delivered all the packages, the train will return to the master station where it is met by the mechanism 61 and retarded until it stops. The mechanism is then activated to bring the train back into a position where it is located ready to receive further packages. If there is no mail to fill the train, then the train simply stands at the master station and waits until the mail arrives.

Figure 2:
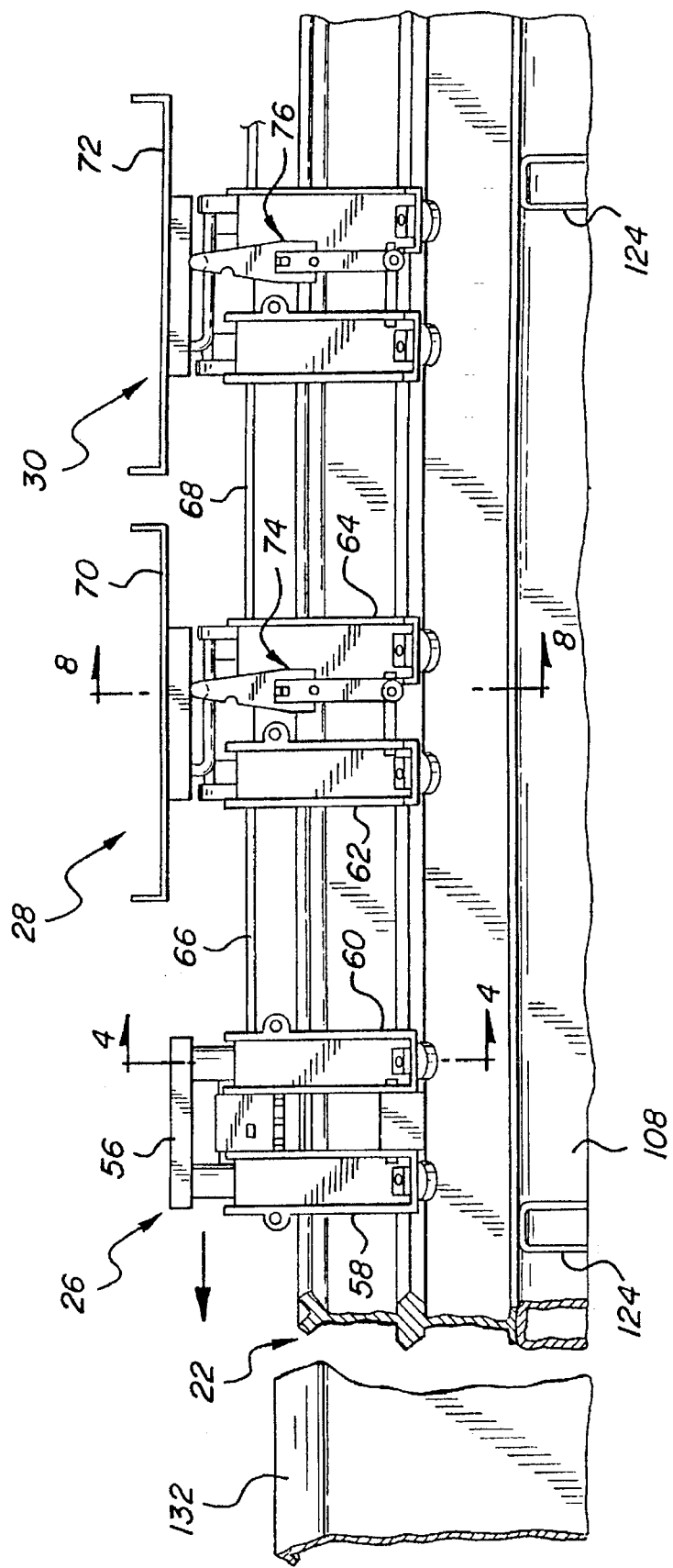

Some details of the prior art train of FIG. 1 are shown in FIG. 2. The locomotive 26 includes a logic unit 56 having a receiver for receiving the transmission from the master station and a microprocessor for acting on the information from the transmitter 50 (FIG. 1). The unit 56 sits on a pair of similar sub-assemblies 58,60 which form the basis of all of the cars as well as the locomotive. The locomotive travels on the track 22 and pulls car 30 through a draw bar 66. Similarly, a draw bar 68 pulls car 32 and so on.

Each of the cars carries a tray, for instance the car 30 carries a tray 70 and the car 32 carries a tray 72. These are associated with respect to discharge mechanisms 74,76. These discharge mechanisms will normally be in a neutral position where they will not engage tilt activators at the slave stations and they can be actuated by the locomotive into an engagement position where they will meet the slave stations. As a result of the engagement between the slave station and the discharge mechanism, the corresponding tray will be tilted to one side as required to unload the packet from the tray at the corresponding slave station.

Figure 5:
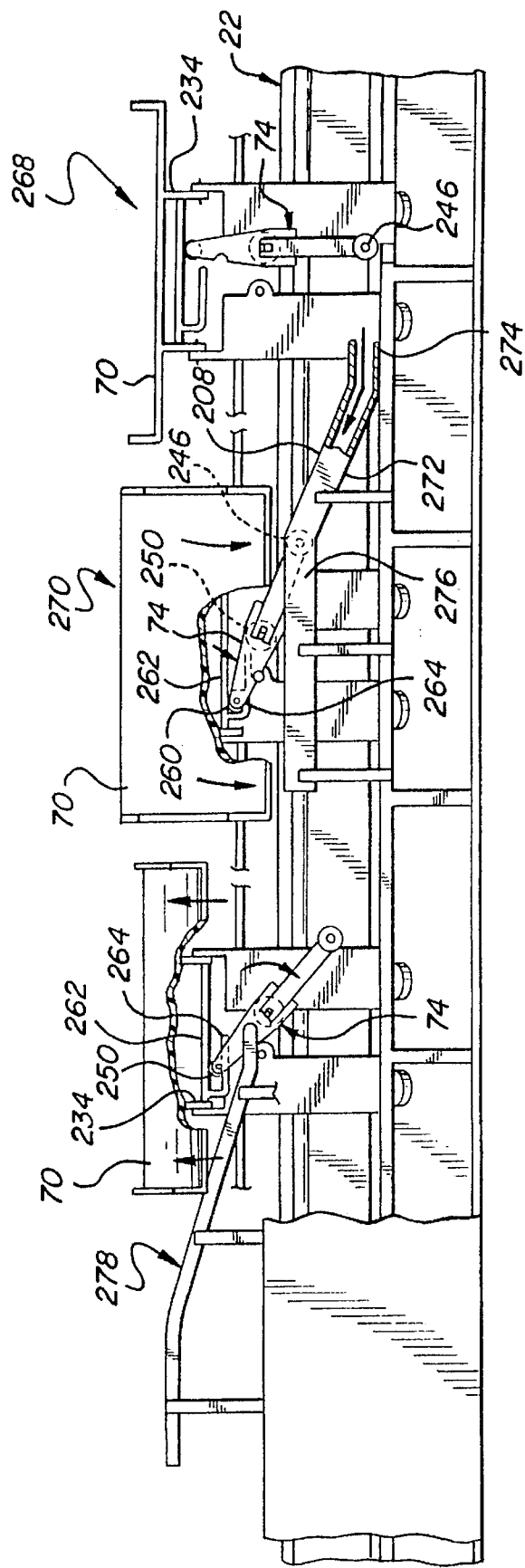

Referring now to FIGS. 3 and 4, the cars are provided with a dual set of discharge mechanisms 74 on each side of the car 32; each mechanism tipping in one direction having a tilt arm 240 attached to the horizontal pin 242 to a follower 244 having at its lower extremity a roller 246 proportioned to engage in a channel element 208 at the slave or discharge stations. The pin 242 forms a connection between the follower 242 and arm 240 such as they will move in unison above the axis of a tubular shaft 248 attached to a bushing 250 on the tilt arm 240. The tilt arm 240 is fixed firmly to the shaft 248 for rotation above the axis of a shaft where as the follower 244 is fixed firmly by pin 242 to the tilt arm 240. The follower 244 is controlled relative to the pin 242 by an internal solenoid 254 in the shaft 248. The solenoid is fixed in place and is attached by a link to a fork formed in the upper end of the follower 244. The solenoid is powered to push the tilt arm 240 to tilt about pin 242 and bring the roller 246 into a neutral position where it will not engage with the channel element 208. As long as the solenoid is powered this way, the car will travel around the track without engaging a slave station. Once the solenoid is actuated, the roller 246 is brought into the path of channel element 208, operating tilt mechanism 74 to tilt the tray as shown at 270 in FIG. 5. The tray remains tilted until tilt mechanism 74 is moved back to its original position. In FIG. 5 this is achieved by providing a subsequent straightening ramp 278 which engages the tray to return the tray and the tilt mechanism 74 to the original neutral position.

These and other features of the prior art device can be seen by reference to U.S. Pat. No. 5,018,928 to Hartlepp, issued May 28, 1991. The Hartlepp system is limited in several important respects. Because the central dispatch computer monitors and directly controls track-side systems such as loading of the train, and because there is no communication or control between the train and the track-side systems (loading and discharge stations), operation of the system depends on the centralized, off-track computer control. Without frequent instructions from the host computer the train cannot monitor or control the loading and discharge station activities. The tilt mechanism 74 is only capable of tilting the tray in one direction, requiring two tilt mechanisms for each trolley, one on each side, and separate channel structure 208 on opposite sides of the track. These and other limitations of the prior art are solved by the present invention described below.

Referring now to FIGS. 6–12, a train-type material handling and sortation system according to the present invention is illustrated. Because the present invention centralizes mechanical systems and control on the train-type mechanism, which can then monitor and control train-side and track-side operations with local intelligence, control systems and sensing and/or signalling means, the illustration of the invention primarily focuses on the train itself rather than the track and track-side mechanisms. Since the present invention is capable of operating with various types of track, around various track configurations, and with various types and arrangements of track-side systems or devices interacting with the train, for illustrative purposes it can be assumed that the train of the present invention is operating in a simplified track and station arrangement similar to that shown in FIG. 1. With system control centralized on the train, the flexibility of the overall material handling operation is increased, while cost is reduced, and a high degree of autonomous operation by the train is made possible.

Figure 6:
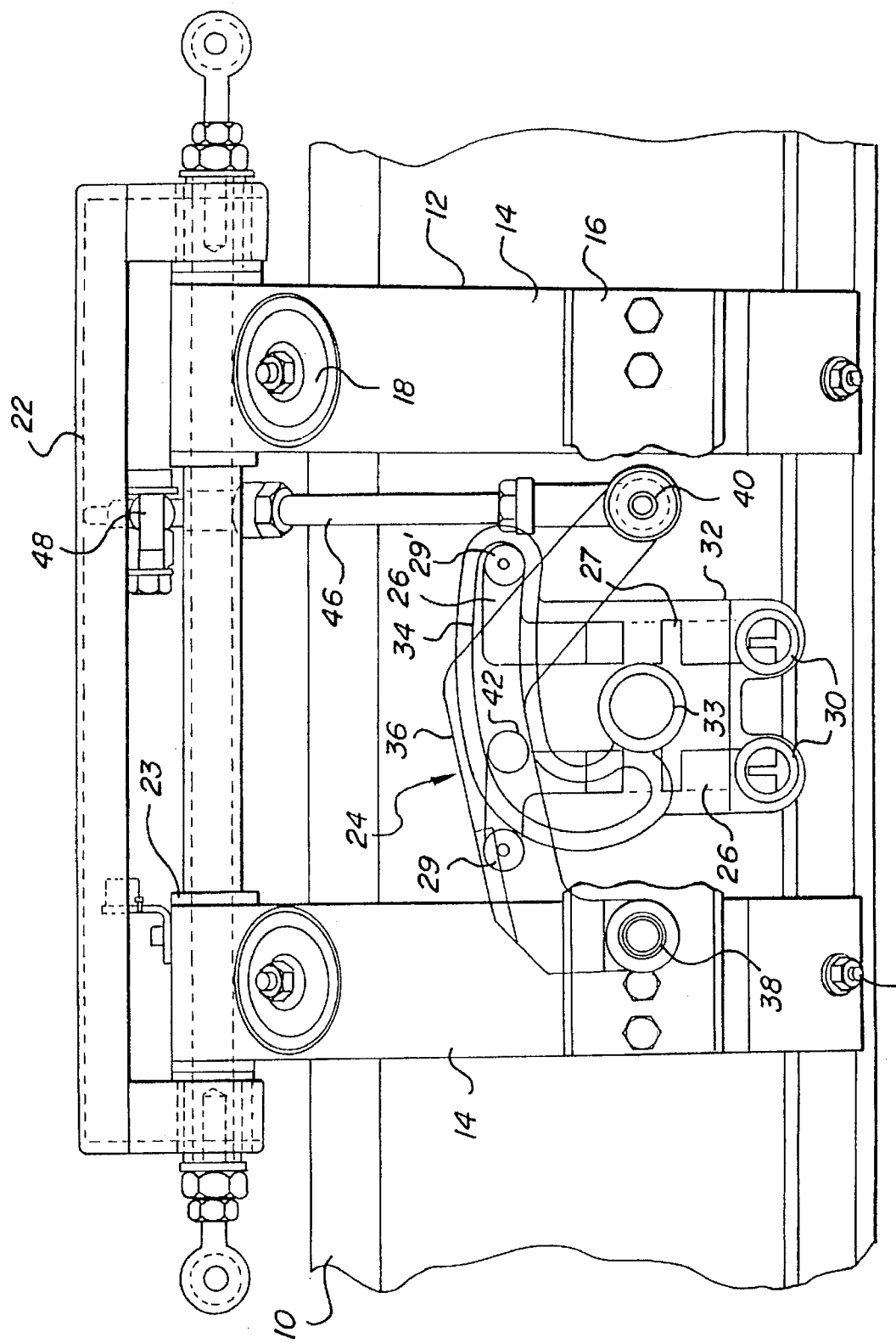
FIG. 6 is a side view of a trolley car according to the present invention.
Figure 7A:
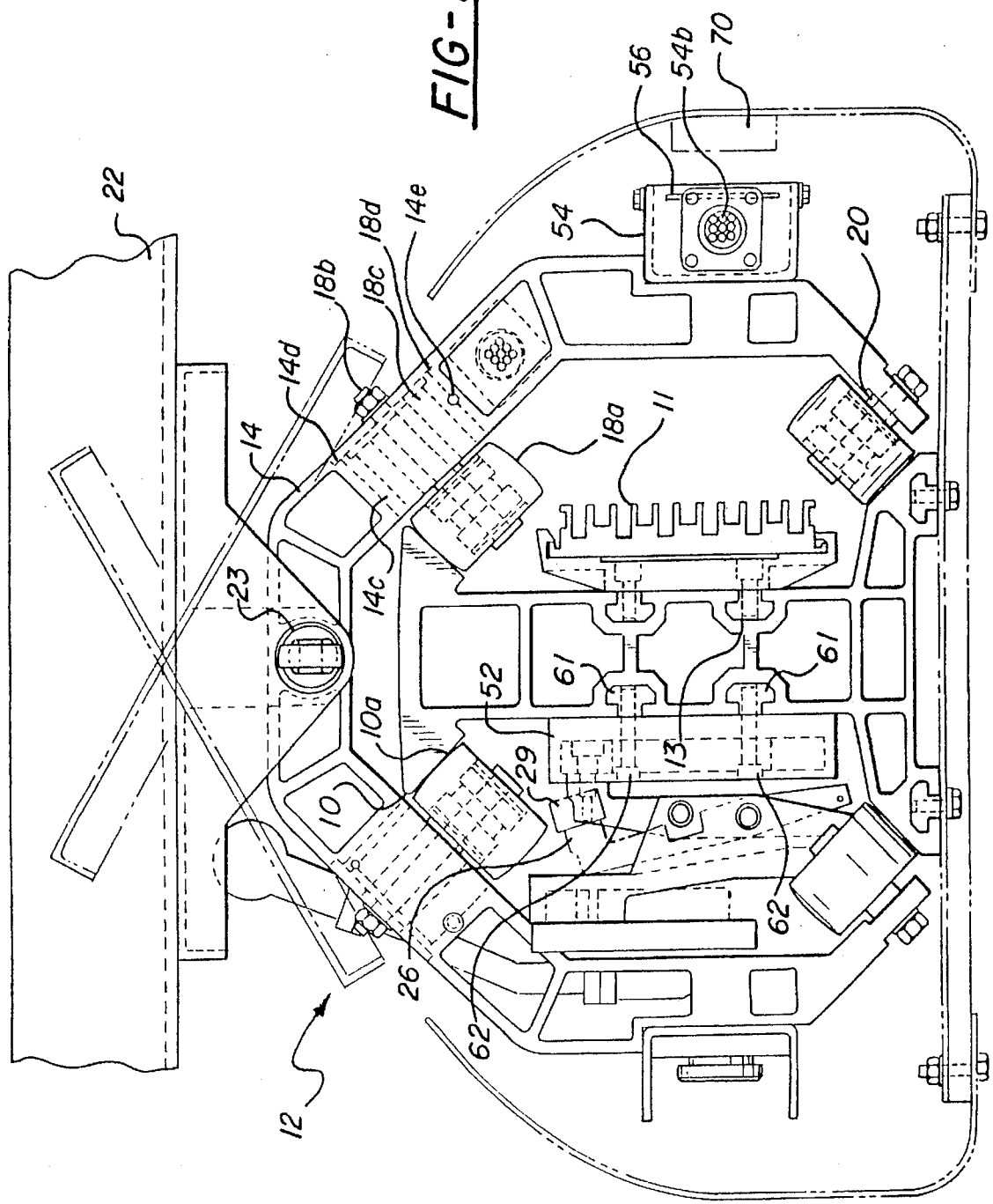

Referring now to FIGS. 6 and 7A, a trolley 12 according to the present invention is shown mounted for movement on track 10. Trolley 12 includes a pair of vertical frame members 14 connected by a horizontal frame member 16 on each side of the track. The trolley frame includes removable upper wheel assemblies 18 and lower wheel assemblies 20 whose wheels (not shown) ride on wheel surfaces of track 10 radially inward of the trolley frame.

The trolley frame supports a tilt tray 22 which pivots on suitable bearings 23 in the trolley frame to either side of the track 10.

The tilting of tray 22 to either side is controlled by a single discharge mechanism generally shown at 24. The discharge mechanism includes two tipper arms 26 mounted on a support plate 32, the tipper arms 26 pivoted toward and away from track 10 about pivot points 27 by solenoids 30. Tipper arms 26 are provided at their track-engaging upper ends with cam followers 29 for purposes hereinafter described. Support plate 32 is rotatably mounted to the inside of the trolley frame adjacent track 10 in a suitable manner, for example to horizontal frame member 16.

Discharge mechanism 24 further includes an integral cam portion 34 on plate 32. Plate 32 and cam portion 34 in the illustrated embodiment are cast from a single piece of metal. Support plate 32 and cam portion 34 rotate about a central pivot bushing 33 relative to the trolley frame in a plane essentially parallel to the sides of the track.

An angled trip arm 36 is pivotally connected at one end to the trolley frame on bushing 38, and includes a fixed cam follower 42 trapped within the cam track of cam portion 34 as shown. Trip arm 36 is connected at its opposite end to a vertical link arm 46 on rotatable bushing 40. Link arm 46 in turn is connected at its upper end to a tray pivot link 48.

It will be appreciated from the illustration of FIG. 6 that rotation of discharge mechanism support plate 32 will exert either an upward or a downward force on tilt tray 22 through link arm 46, depending on the direction of rotation. If support plate 32 and integral cam portion 34 are rotated counterclockwise, cam follower 42 and trip arm 36 rotate counterclockwise about bushing 38, pushing link arm 46 upwardly at bushing 40. If support plate 32 is rotated clockwise, cam portion 34 operates on follower 42 of trip arm 36 to rotate the trip arm clockwise and pull link arm 46 downwardly. When link arm 46 is forced upwardly against tray pivot link 48, the tray is pivoted to the side of the track not shown. When the link arm pulls downwardly on tray pivot link 48, the tilt tray 22 is tipped toward the side of the track discharge mechanism 24.

Rotation of discharge mechanism 24 is controlled by forces exerted on the left and right tipper arms 26, respectively, as they selectively engage passive track-side structure described in further detail below. Actuation of the lefthand tipper arm 26 results in a counterclockwise rotation of discharge mechanism 24 and an upward force exerted by link arm 46 on tilt tray 22. Activation of righthand tipper arm 26' results in a counterclockwise rotation and downward force against tilt tray 22.

Figure 6A:
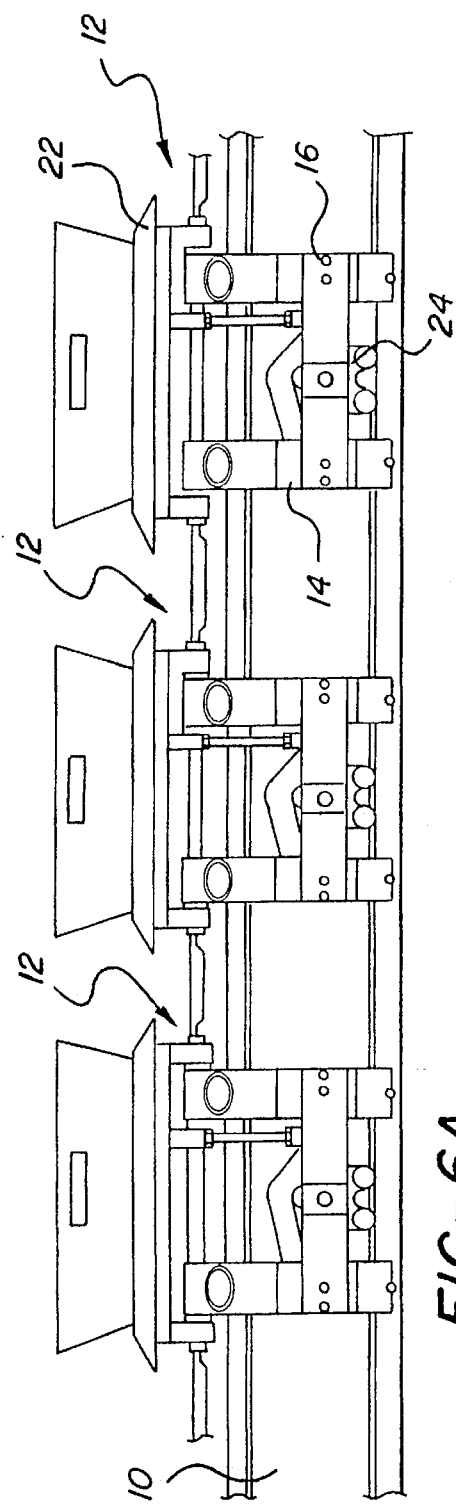
FIG. 6A is a side view of a train of linked trolleys according to FIG. 6.

FIG. 6A illustrates an interconnected series of trolleys 12 according to FIG. 6.

Referring to FIG. 7A, track 10 is provided on one side with a commercially available, bus bar type six-tracked power rail 11 from which the train locomotive receives electrical power through sliding contacts (not shown). The other side of the track is provided with a track-side tipping ramp structure 52 comprising a hyperbolic, elongated, S-curved ramp best shown in FIG. 9. The pivoting action of tipper arms 26 which moves their cam followers 29 into and out of engagement with ramp 52 can be clearly seen in FIG. 7B. Actuation of solenoids 30 selectively pulls the lower ends of the tipper arms away from the track, pivoting the tipper arms 26 about pivot points 27 until cam followers 29 are in a position to engage ramp 52 on track 10.

FIG. 7A illustrates the structure of upper and lower wheel assemblies 18,20 and the engagement of their respective wheels on suitable rail surfaces of track 10. Upper wheel assemblies 18 are detachable, for example in the illustrated embodiment via quick release pins 19, to facilitate installation and removal of the trolley to and from the track. Each wheel assembly 18 includes a wheel 18a rotating on a central shaft 18b on suitable bearings. Each wheel assembly 18 also includes an upper cylindrical bushing 18c with a radial flange 18d. Bushing assembly 18c fits within the cylindrical opening 14c in trolley frame member 14 whose diameter is slightly greater than the diameter of wheel 18a. Circular flange 18d mates with a cutout region 14d surrounding opening 14c to properly position wheel assembly 18 relative to the rail surface on the track. Quick release pin 19 is inserted through a bore 14e in frame number 14 and a bore 18e in wheel assembly 18, aligned with bore 14e when the wheel assembly is inserted as shown. Wheel assembly 18 is positively locked in place with respect to frame 14 until pin 19 is withdrawn from bores 14e, 18e, at which point wheel assembly 18 can simply be lifted off track 10 and out through bore 14c.

Because the upper rail surfaces 10a of track 10 are spaced a distance less than lower rail surfaces 10b, removal of upper wheel assemblies 18 allows the entire trolley 12 to be lifted off the track. The spacing of lower wheel assemblies 20 and the lower ends of the trolley frame have sufficient clearance around upper rail surfaces 10a.

FIG. 7A also shows the left-right pivoting or tilting of tilt tray 22 about bushings 23 on trolley frame members 14.

The discharge mechanism 24 on each trolley is controlled by a trolley computer 54 mounted on the trolley frame. In the illustrated embodiment (FIGS. 7A–7D) the trolley computer is a single field replaceable sub-assembly approximately 2×10 inches. It includes chute-available sensing mechanisms, and the electronics needed to operate the trolley such as a circuit control card 56, connectors 57, and a trolley-unique ID register assigned an ID number on power-up from the tug computer. The trolley computer communicates with a local microprocessor on the train tug or locomotive via a multi-drop RS-485 communications link, and receives and distributes electrical power from the tug through suitable wiring.

The solenoids 30 of the discharge mechanism are selectively actuated by trolley computer 54 to operate tipper arms 26. Actuation of the solenoids by tipping computer 54 depends on a train-side chute-available verification procedure described below. The actuation of tipper arms 26 by solenoids 30 is best shown in the partial side view of FIG. 7B.

Referring to partial end view FIG. 7C, each trolley is provided with a number of tray position sensors 58, in the illustrated embodiment a number of photocells in an optical encoder module. Signals from tray position, sensors 58 to trolley computer 54 indicate whether the tray is tipped left or right in a discharge position, is in the level and locked transport/induction position, or in between. This information on tray position is sent by the tipper computer 54 to the computer on the tug. In the illustrative embodiment of FIG. 7C, sensors 58 comprise two commercially available horseshoe-shaped photocell sender/receiver pairs connected to the trolley computer in suitable fashion. A semi-circular vane 59 on the bottom of tray 22 is provided with a number of cutout regions 59a spaced evenly therealong to be selectively aligned with sensors 58 to transmit the photocell beam from sender to receiver. As the tray tilts between a level and locked position and left and right tipped positions as shown in phantom, the degree to which sensors 58 are blocked by the solid portion of the vane indicate the tray position. For example, when two cutouts 59a are aligned with sensors 58, the "open" status of both sensors indicates that the tray is in the level and locked position. When one sensor 58 is "open", and the other is blocked by vane 59, a tilt to one side is indicated; when the second sensor 58 is open and the first sensor 58 is blocked, a tilt to the opposite side is indicated. When both sensors 58 are blocked, this provides an indication that the tray is between a fully tipped position and the level and locked position.

Referring to the plan view of trolley 12 in FIG. 7D, adjacent trollies are connected by a trolley connector 82 attached by pull pins 83 to flexible trolley couplings 84. Also shown in the plan view of FIG. 7D is the trolley-mounted tipping computer 54 and serial power and data transmission links connecting each trolley computer 54 to receive electrical power from the tug and to transmit and receive data to and from the tug computer. Digital data transmission connectors are connected with suitable male pin connectors at each end of the trolley computer 52, while a power connector provides electrical power to both the computer 54 and all electrically operated devices on the trolley, such as photocells and solenoids.

Figure 12:
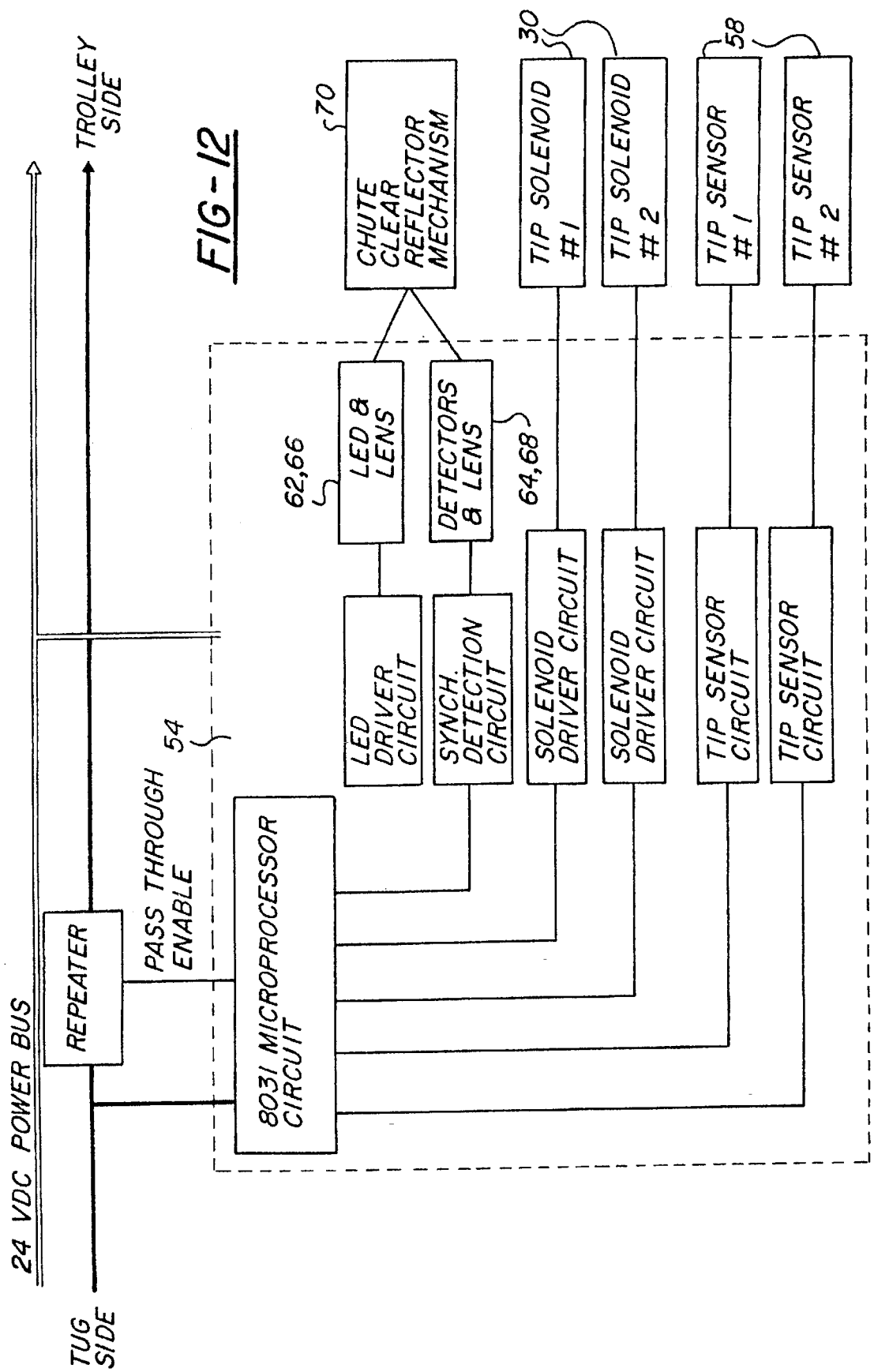
FIG. 12 is a schematic chart of a chute availability detection system according to FIGS. 10–13.

Trolley computer 54 is mounted on the side of the trolley as noted above. In the illustrated embodiment of FIG. 7D, it includes a flange mount pin connector 54a to connect it to the previous trolley (or the tug), and a second flange mount pin connector 54b to connect it to the following trolley 12 on the train. The trolley computers 54 are connected by cables 54c that run through the tow bars 13 between trolleys. The cable coming from the tug or up-track side of the trolley splits as shown at 54d to provide connections between the trolley computer and the solenoids 30 and tray sensors 58 on the trolley. In the illustrated embodiment, the trolley computer includes a 12 Mhz 80C51 microprocessor with 27C64 Eprom (8 k), with 19.2 k baud RS45 communication to the tug with pass through enable for automatic addressing by the tug computer. It also includes various circuitry, as shown in FIG. 12, for two switch inputs to detect the tray in the horizontal position and left and right tipped positions from tray position sensors, and for actuating the solenoids 30 for the left and right tipper arms. Also included in the trolley computer 54 is circuitry for two synchronous infrared LED transmitters/detector photoswitches 62, 64 and 66,68 described below.

Figure 8A:
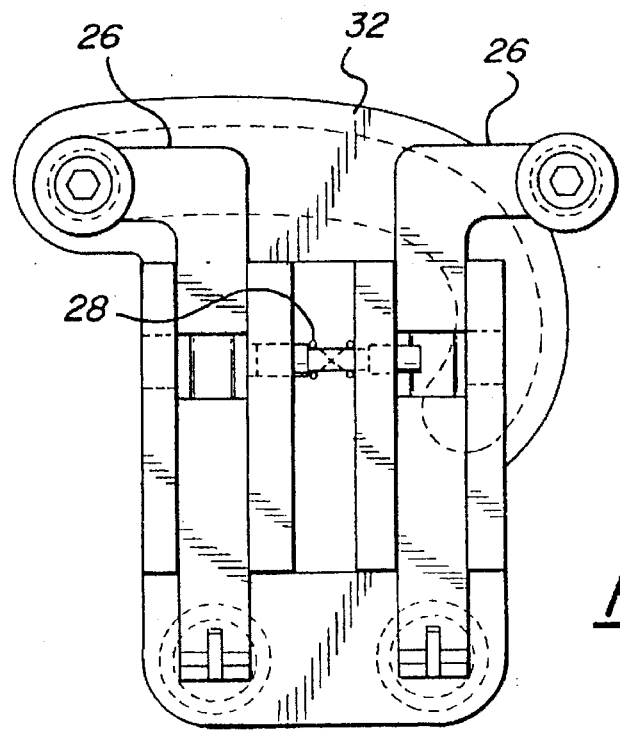
FIGS. 8A–8D are various views of the discharge actuating structure of FIG. 6.
Figure 8B:
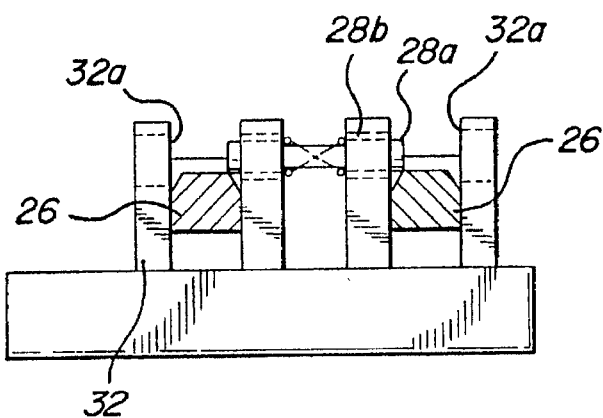
Figure 8C:
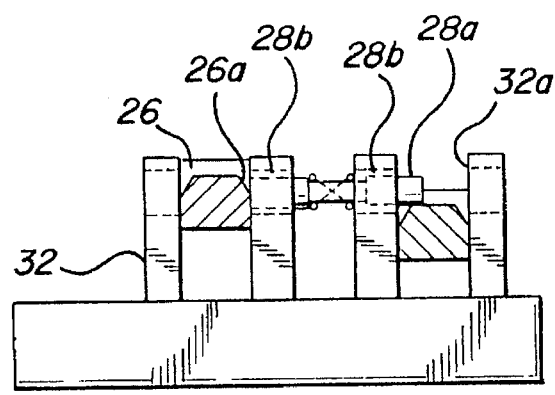
Figure 8D:
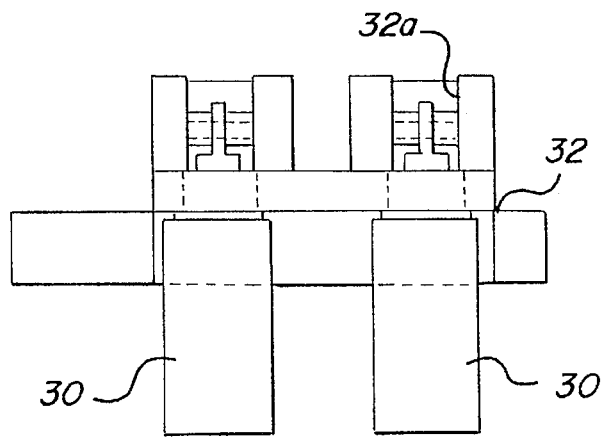

Referring now to FIGS. 8a-d, the components of the discharge mechanism 24 are shown separately from various views. In FIG. 8a the support plate 32 and the tipper arms 26 are shown including an interlock mechanism 28 which provides a mechanical backup to the tipping computer to prevent simultaneous actuation of both tipper arms. In FIGS. 8b and 8c, tipper arms 26 are shown pivotally positioned in slots 32a of support plate 32 with a passive, spring-biased mechanical interlock pin 28a whose ends extend through a bore 28b partway into each slot 32a as shown in FIG. 8b. When both tipper arms 26 are disengaged from the track-side tipping ramp and are in the retracted position of FIG. 8b, spring-biased pin 28a is centered relative to tipper arms 26. When one tipper arm is pivoted toward the track to engage the track-side tipping ramp as shown in FIG. 8C, beveled cutout 26a cams the associated end of pin 28a against the bias of its spring and out of the activated tipper arm's slot 32a. At the same time, the opposite end of pin 28 is forced further into the other slot 32a containing the retracted tipper arm, past the beveled cutout 26a portion to lock that tipper arm in the retracted position. In FIG. 8c, the lefthand tipper arm 26 has been activated, forcing pin 28 to the right against the bias of its spring to lock the righthand tipper arm 26 in the disengaged position. In this fashion, a single, passive interlock is provided against simultaneous tipper arm activation, as a backup to the computer control of the tipper arms.

Figure 9:
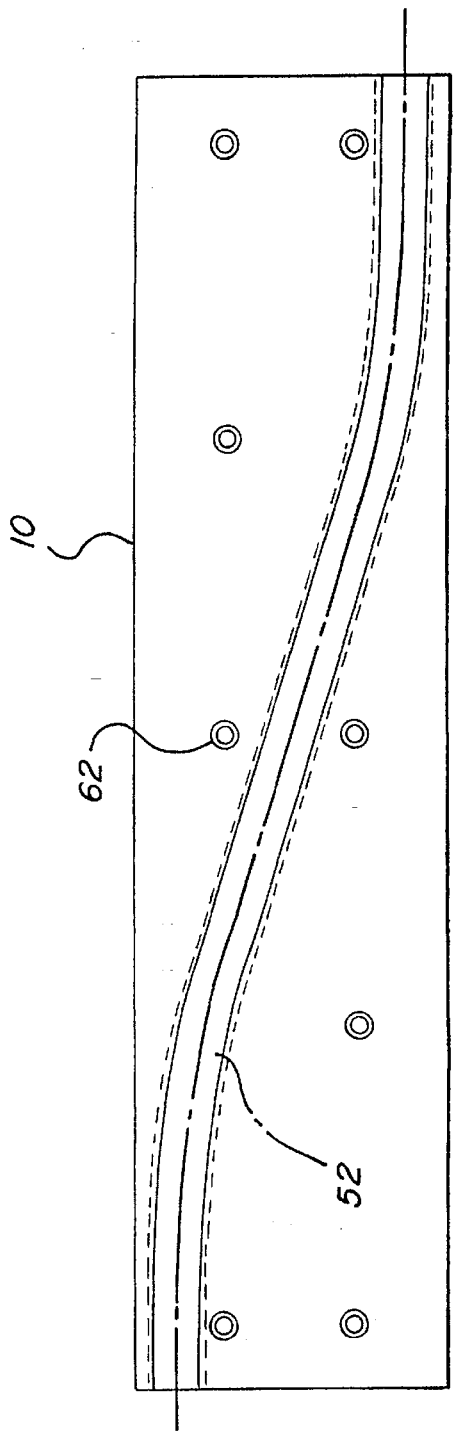
FIG. 9 is a side view of a passive track-side tip-actuating structure.

Referring to FIG. 9, the passive track-side tipping ramp structure 52 of the present invention is illustrated.

Track-side tipping ramp 52 in the illustrated embodiment is a simple, dual-hyperbolic curved shape that smoothly cooperates with tipper arm followers 29. The tipping ramp 52 is attached directly to track 10, at any location, with sliding T-shaped nuts 61 and bolts 62 in slots 11 (FIG. 7A). Tipping ramp 52 can be moved to fine tune the discharge landing zone by loosening the bolts and sliding the ramp toward or away from a discharge station on the track, as appropriate.

Figure 7B:
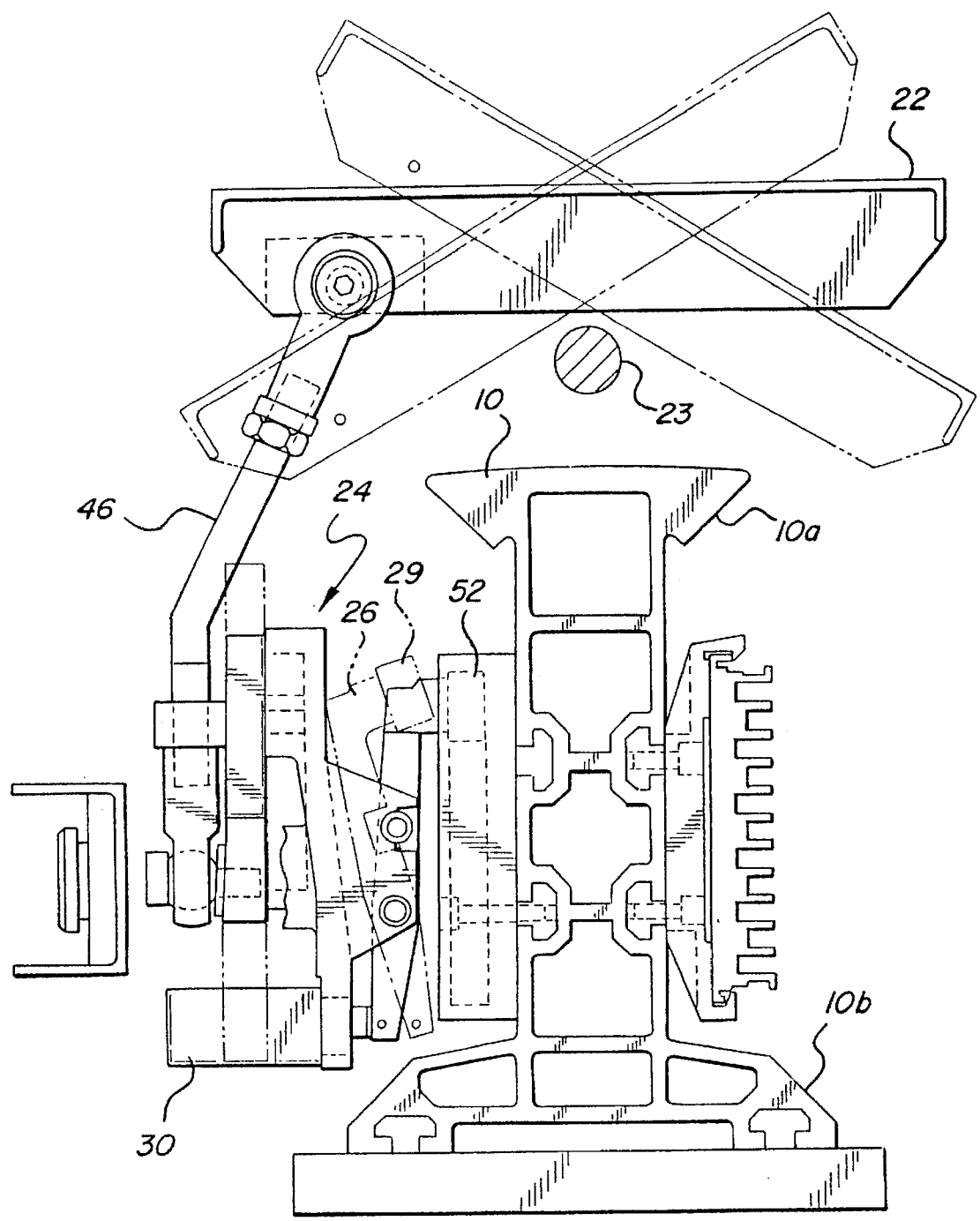

As a string of trolleys 12 passes a track-side tipping ramp as they approach a discharge station, one or more of the trolleys in the array may be signaled by the tug computer to engage the track-side tipping ramp 52 via an activated tipper arm 26. As the cam follower 29 of activated tipper arm 26 engages and enters the upper entrance 52a of the tipping ramp 52 as shown in FIG. 7B, cam follower 29 is forced along the contours of the tipping ramp to exert a rotational force through tipper arm 26 and support plate 32. Depending on which tipper arm engages ramp 52, the force exerted by the ramp through arm 26 will rotate the support plate 32 of discharge mechanism 24 either clockwise or counterclockwise to tip tray 22 in the appropriate direction. In the illustrated embodiment of the discharge mechanism 24 in FIG. 7A, activation of the lefthand tipper arm 26 to engage tipping ramp 60 as the trolley moves in the direction of the illustrated arrow forces the cam follower 29 downwardly along the curve of the tipping ramp and rotates the discharge mechanism counterclockwise to tip the tilt tray 22.

Once the tray has been tipped and its load discharged at a suitable discharge station, and the activated tipper arm 26 has exited the tipping ramp 52, the tray remains in the tilted position until cam follower 29 on the still-activated tipper arm engages a reversely-curved tray straightening ramp (not shown) or a conventional tray straightener downstream of the discharge station. The tray straightening ramp is simply a mirror image of the tipping ramp 52, and exerts an opposite rotational force on the still-activated tipper arm to return the tray to its level position. The solenoid 30 then retracts the tipper arm returning it to its neutral, disengaged position until the next discharge operation.

With the dual tipper arms and cam discharge mechanism of the present invention, a single tipping ramp 52 located on one side of the track can provide the motive force for both left and right tips. Additionally, with a single tipping ramp 52 activating both left and right tipping operations, the height of the tipping ramp can extend essentially the entire height of the track side surface on which it is mounted, providing a longer, smoother, more powerful camming action to the trolley-mounted discharge mechanism.

The hyperbolic curved profile of the tipping ramp 52 gently accelerates the tray tipping action as the tipper arm 26 moves along the ramp. The ramp length is selected to match the nominal trolley speed past the associated discharge station. This permits controlled and gentle tray tipping action for both low and high trolley speeds simply by changing the overall length of the ramp relative to its height. A shorter ramp results in higher tipping speed to match lower trolley speed, while a longer ramp produces lower tipping speed to match higher trolley speed.

Figure 10:
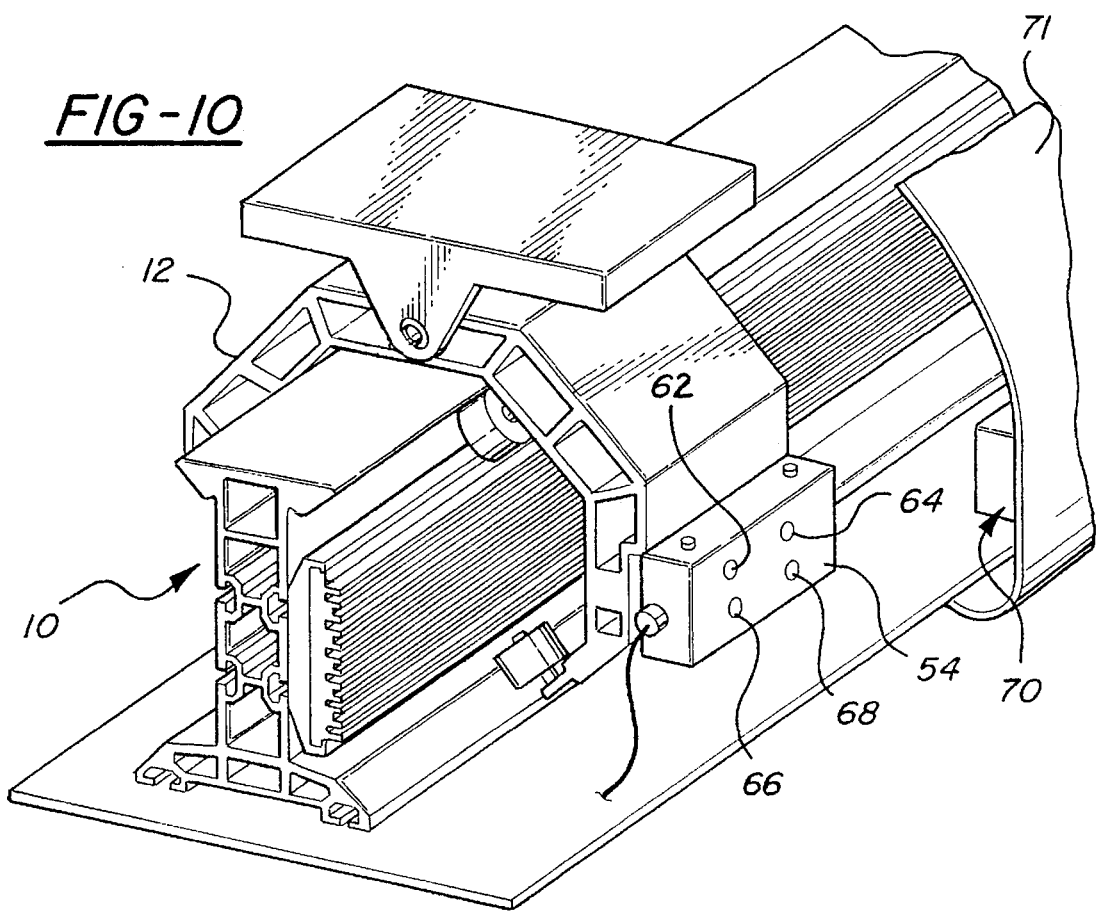
FIG. 10 is a schematic perspective view of a train-based sensing and signaling system according to the present invention.

Referring now to FIGS. 10–12, a further feature of the present invention is shown in which the train or the individual trolleys on the train are provided with locally-controlled sensing and signaling devices to monitor and control the interaction of the train with track-side operations, for example induction, discharge and track-switching operations. In the illustrated embodiment of FIG. 10, the trolleys sense the availability of the discharge stations, for example chutes, for which packages are scheduled to be discharged per instructions from the tug microprocessor. Alternately, the schematic embodiment of FIG. 10 can operate as an induction signaling system in which the moving trolleys signal the induction stations for package induction onto the tilt trays.

The trolley computer 54 includes optical sender/receiver structure, for example an infrared transmitter/receiver to send and receive signals to and from the discharge and induction stations and enable the induction and discharge operations on the trolley accordingly. In FIG. 10 the induction or discharge station is schematically represented by a passive switch or status indicator 70 engaged by the trolley signaling and sensing devices up-track of the station as the trolley approaches.

A trolley 12 is schematically shown with a trolley computer 54 including a pair of sensing/signaling devices such as infrared photoswitches 62,64 and 66,68. In FIG. 10, the track-side system or mechanism 70 with which the train interacts as it passes a discharge station is a passive status indicator, here a reflector device 70, mounted adjacent the track facing the trolley, for example on a mounting bracket as shown at 71. In the illustrated embodiment of FIGS. 10–11, the upper set of photoswitches 62,64 control the tipper arm solenoid for a tip in one direction, while the lower set of photoswitches 66,68 control the tipper arm solenoid for the other tipper arm.

Referring to FIG. 12, a schematic diagram of connections between the above-described circuitry on the trolley computer 54, the infrared photo switches, and solenoids 30 and tip sensors 58 is shown.

The track-side reflector 70 in FIG. 10 is a passive mechanical reflector which reflects light from the sending photoswitches 62,66 back to receivers 64,68, for example to close one or the other of the switches.

Each discharge station, for example chutes with a temporary storage capacity of more than one parcel or unit of the goods being discharged by the train, can be provided with a suitable passive, parcel-controlled switch mechanism located in the chute to be triggered when a "chute full" condition is reached. For example, a chute may be capable of receiving five packages or items discharged from the train, progressively stacking up until a "full" condition is reached. The switch can be placed in an area of the chute at least temporarily occupied by discharged parcels. It is desirable to ignore momentary switch transitions as parcels or goods pass the switch when the chute is not full. When the switch is engaged for a predetermined period indicating that the package is not merely passing through the chute, but is in fact stacking up on previously-discharged packages, the switch is triggered to indicate a chute-full condition. It may be desirable to indicate that the chute is full at less than actual capacity to provide a cushion or margin of safety for packages which may be discharged before the chute status can be determined by the train to disable the discharge mechanisms.

Figure 13A:
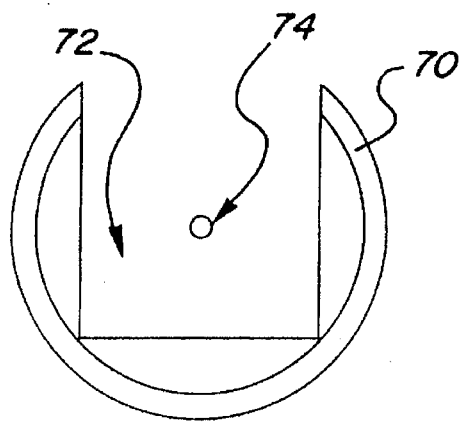
FIGS. 13A–13C are schematic views of passive track-side system status indicators for use with the train-side availability detector mechanism of FIGS. 10–13.
Figure 13B:
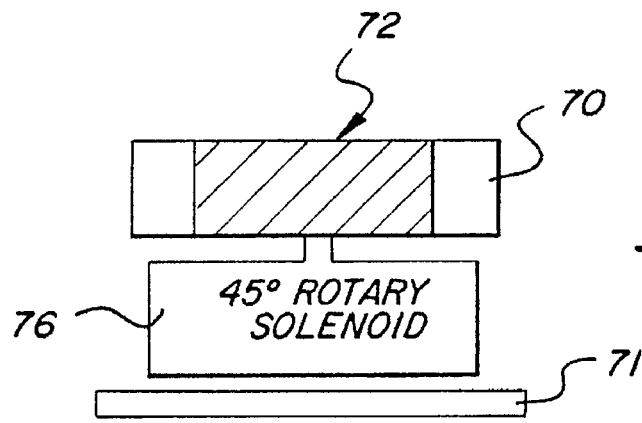
Figure 13C:
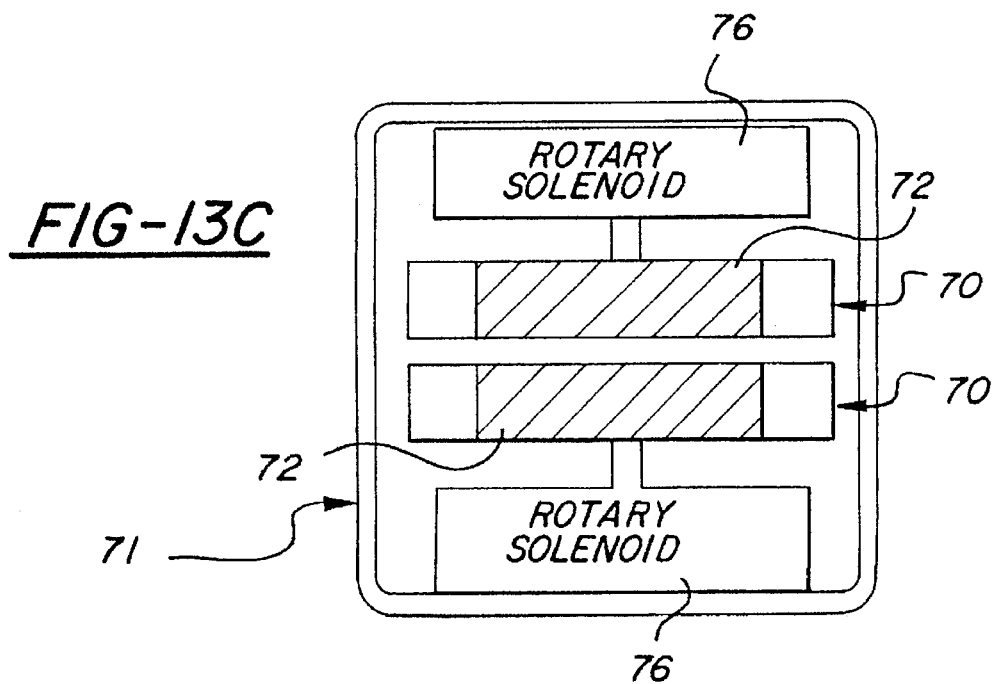

The passive, discharge-operated switch mechanism is connected to a track-side chute available indicator, for example an IR-reflective mirror, to switch it between chute full and chute available signalling modes. For example, in the illustrated embodiment the IR-reflective mirror 70, shown schematically in FIGS. 13A–13C, is a rotating mirror with a recessed reflective area 72 pivoted on a pivot bearing 74 by a 45° rotary solenoid 76. The reflective area 72 of signal device 70 normally faces the track and the infrared sender/receiver arrays 62, 64 and 66,68 on the trolleys 12 when the chute is available; i.e., when the chute has not reached its capacity and it can still receive items discharged from the trolleys. As long as the reflective area 72 is positioned to reflect light from IR senders 62, 66 to receivers 64,68, the tipping computer reads the chute as "available" and activates the appropriate tipper arm.

When the number or volume of items received in the discharge chute is such to trigger the passive chute switch, the switch activates rotary solenoid 76 to pivot signal device 70 sufficiently to rotate reflective area 72 to a position where it will not reflect the infrared light transmitted from the trolley arrays 62,66. When the trolley passes the disabled mirror 70, sends its infrared chute availability detection signal from either of the infrared arrays 62,66, and receives no return signal, the trolley computer prevents the tray from tipping and discharging its contents into the chute. The switch on the chute continues to produce a "chute full" signal to passing trolleys until the chute is at least partially cleared and the switch released.

It will be understood by those skilled in the art that many different mechanisms can be employed at the discharge stations or chutes to provide an essentially passive indicator to a passing trolley's availability inquiry. While the illustrated embodiment discloses an electrically-operated solenoid and rotary mirror device, it will be understood that mechanical switch and mirror signaling devices can be used. Additionally, it may be desirable to use two separate chute available signal devices at each discharge station, one for each infrared array 62,64 and 66,68 on the trolley to signal the availability of a discharge chute on either side of the trolley.

For example, in an alternate embodiment a photocell light beam can be directed across the chute in an appropriate location which, when broken, indicates a chute full condition. Breaking of the light beam causes the photocell to electrically enable a second photocell mounted adjacent the track, which signals the infrared receivers on the trolley that the chute is full. In another embodiment, the photocell switch across the chute can be provided with a fiber optic light transmitting cable which normally transmits light from the chute photocell to a point adjacent the track where it can be received by the receiving means on a passing trolley. As long as light is being transmitted, the IR receivers 64,68 on the trolley computer will read the chute as available. When a chute full condition breaks the light beam at the chute, the track side "available" signal is no longer present and the trolley computer does not discharge the trolley's contents.

In another embodiment it may be desired to use a purely mechanical system, particularly in areas where it is difficult to provide electrical power to operate electrical switches and photocell devices at the discharge stations. A mechanical switch can be placed on the discharge chute to indicate a full condition when activated by a package or item in the chute, and can, for example through a control cable, mechanically rotate or shutter a mirror 70 as described in FIG. 13A.

Referring again to FIG. 10, where trolley 12 is approaching an induction station for items to be loaded onto its tilt-tray, device 70 is provided as a passive switch, for example an infrared receiver, which enables an induction mechanism at the induction station to place an item on the trolley as it moves past. Induction switch device 70 is positioned up-track of the induction station, and as the trolley approaches the induction station it initiates communication with the induction station by signaling device 70 with IR senders 62,66 to start inducting a load. Timing of the induction depends on trolley speed as it approaches the induction station; for a given induction process, for example an induction conveyor, induction timing is determined by the speed, grip, length and other characteristics of the induction device. This time, in conjunction with the distance upstream of an induction switch device 70, determines the speed that a tilt-tray must be traveling to be precisely positioned to receive the inducted goods. Train speed can be adjusted by the locomotive to operate the train through each induction station or process at the proper speed to match the performance characteristics of that particular station. Or, for a train moving at a fixed speed on the track, the induction switch device 70 can be moved toward or away from the induction station to adjust timing for train speed.

To improve the accuracy of induction, the IR senders 62,66 are preferably located at the front-to-back center of the tilt tray 22, thus indicating the position of the middle of the tray regardless of the tray length. The induction signal given by the IR senders on the trolley computer 54 is controlled by commands from the tug computer, which also keeps track of whether an individual tilt tray is empty or occupied, for example by monitoring the history of tray position sensors 58 since the last load was received on that tray.

Accordingly, when a train with an empty tilt tray approaches an induction station with desired items to be loaded, the appropriate trolley IR sender is actuated, triggering the induction sensor 70 and causing an available parcel to be precisely inducted on the proper trolley.

In the illustrated embodiment the induction sensor 70 uses a commercially available photoelectric transmitted beam sensing switch.

Again, while the illustrated embodiments above show a train- or trolley-based control concept with respect to induction and discharge stations in a material handling system, the trolley-side sensing and signaling devices can be used to monitor or activate other track-side devices, stations or systems with which the train interacts as it passes. For example, track switches placed near track junction points to diverge or merge trains can be activated by a train as it passes, for example with the infrared sender/receiver arrays on a trolley computer (or a similar array on the tug), or if a mechanical switch by the tipper arm 26.

Figure 14:
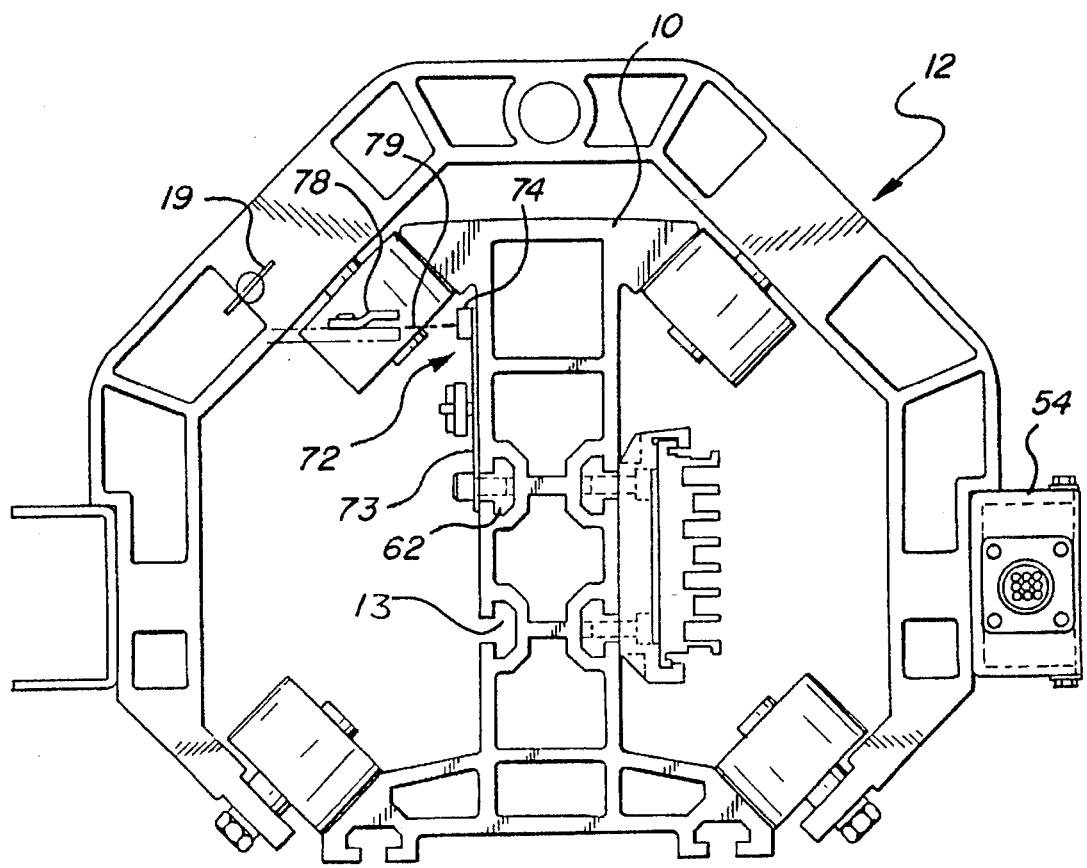
FIG. 14 is a simplified end view of the trolley of FIG. 3 showing a train locating mechanism according to the present invention.

FIG. 14 is a partial section end view of a trolley according to FIG. 7A, including a track locator mechanism 72. Spaced at various points around the track 10 are track locators in the form of individually serial-numbered I.D. buttons 74, for example such as commercially available from Dallas Semiconductor. Track locator devices 72 comprise a circuit card and two spaced I.D. buttons 74 mounted to track 10 by the nut and slot arrangement 11,62 described above. The tug or one trolley on each train in the system is provided with two spaced brush contacts 78 whose brush ends are positioned to simultaneously sweep across the spaced I.D. buttons 74 as the tug or trolley passes thereby. Brush contacts 78 are connected to the trolley and/or the tug computers, and simultaneously supply power to the I.D. button 74 and read the serial number of the I.D. buttons when the brush 78 contacts them. Since each track locator device 72 has a unique serial number, the tug or trolley computer can instantly determine its position on the track when it passes over a locator.

Operation

With the physical components and structure of the above-illustrated embodiment of the present invention described in FIGS. 6–14, the overall operation of the system can be readily understood.

As noted above, all active induction and discharge sensing and control mechanisms are centralized on the train itself, more specifically on each trolley 12 capable of receiving and discharging goods from the induction and discharge stations. All track-side structures which cooperate with the train for induction and discharge operations are passive, "dumb" mechanisms selectively engaged by the train as it passes. There is accordingly no need for centralized, off-site monitoring and control of either the train activities or the induction and discharge stations, although such is possible for optimization of the entire system. Accordingly, in operations where it is impractical to centrally monitor and control induction and discharge between the train and the various stations, for example as shown in the prior art system of FIG. 1, or where such a centralized control system becomes temporarily inoperative, the mechanical systems and control located on the train can continue induction and discharge operations on an autonomous, localized level.

When an empty trolley 12 passes an induction station which the tug computer recognizes as containing a package or item to be loaded and transported to a discharge station, trolley 12 initiates communication with the induction station using the chute available sensors 62,64. In this application the chute available sensor reverses its normal role (determining chute availability), and instead signals the availability of its tray to switch means at the discharge station, for example a passive induction infrared receiver switch. By placing the track-side induction signal receiver up-track of the discharge station a distance determined to properly time the induction of a package (typically by a multi-belt metering, acceleration, induction conveyor), the system can accurately time the arrival of the package on the trolley's tilt tray as it passes.

The trolley then proceeds along the track, carrying the previously-inducted package, until the tug computer signals that an appropriate discharge station is being approached. The trolley computer then activates the chute available sensors 62,64 to determine whether the upcoming discharge station is available to receive the contents of the tray. If the chute available sensor determines that the discharge station is indeed open, for example by receiving the reflected infrared signal from the track-side mirror device 70, the trolley computer next activates the appropriate tipper arm 26 to engage the tipping ramp 60 associated with that discharge station. As the trolley passes the tipping ramp, the tipper arm 26 and discharge mechanism 24 are rotated by the ramp to tilt the tray in the appropriate direction and discharge its contents into the discharge station. After the trolley has passed the discharge station, a mirror-image straightening ramp 60a engages the tipper arm 26 to return the tray to the level position for receiving packages at the next induction station.

If the chute available sensor on the trolley determines that the approaching discharge station is not available, the tipper arm is not activated and the trolley will continue around the track carrying its tray load until an appropriate chute is determined to be available.

With the local programming of the tug computer, the trolley-based tip-actuating mechanisms, and chute available and induction sensing/signalling devices, only passive, on/off-type switch or signal devices are needed at the various induction and discharge stations for the train to carry out its material handling and sortation operations autonomously.

We claim:

1. A material handling and transport system for transporting goods between a number of discharge/induction stations and selectively receiving and discharging goods at the stations, comprising:

moving transport means traveling on a defined path between induction and discharge stations;

platform means carried by the moving transport means for receiving goods from induction stations, carrying goods between stations, and discharging goods at discharge stations;

discharge control means on the moving transport means for selectively activating the platform means to discharge goods;

passive discharge actuating means along the path of the moving transport means associated with each discharge station, positioned to be engaged by the discharge control means when the discharge control means are selectively activated;

discharge sensing means on the moving transport means to sense the availability of a discharge station as the transport means approaches; and local control means on the moving transport means for communicating with the discharge sensing means and the discharge control means and for selectively activating the discharge control means when the transport means approaches a discharge station;

the moving transport means comprising a tug or locomotive unit carrying the local control means and pulling at least one trolley unit, the trolley unit carrying the platform means, the discharge control means, and the discharge sensing means, the path of the transport unit comprising a track with the induction and discharge stations located at spaced locations along the track;

wherein the discharge control means includes at least one tipper arm means, and the passive discharge actuating means comprises tipping ramp means located on the track near a discharge station, the tipper arm means selectively movable between a non-enabled state in which it cannot engage the tipping ramp means, and an enabled state where it engages the tipping ramp means as the train passes.

2. A system as defined in claim 1, wherein the discharge control means includes a first tipper arm means which causes the platform means to discharge goods to a first side of the track, and a second tipper arm means which causes the platform means to discharge to a second side of the track when it engages the same tipping ramp means.

3. A system as defined in claim 2, wherein the discharge sensing means include independent discharge sensing means for each tipper arm.

4. A system as defined in claim 2, wherein the discharge control means include mechanical interlock means associated with the first and second tipper arms, the interlock means responsive to movement of one tipper arm to the enabled state to prevent movement of the other tipper arm to the enabled state.

5. A system as defined in claim 1, wherein the tipping ramp means comprises an essentially S-shaped, curved ramp means for producing a sinusoidal motion in the platform means during discharge.

6. A system as defined in claim 5, wherein the tipping ramp means has a height approximating the height of the track.

7. A self-actuating, self-contained signalling and command system for controlling support functions in a material-handling system in which a moving transport receives, transports and discharges goods between induction and discharge stations as it moves along a defined path, the system comprising:

a self-contained sensing means on the transport for selectively sensing the status of a track-side station or device positioned along the path of the transport unit as the transport passes thereby;

signal means on the transport selectively actuated to activate a device stationed along the path of the transport as the transport unit passes; and local computer control means on the transport connected to the sensing and signal means to selectively activate devices along the path of the transport to interact with the transport unit as it passes, and to sense the status of devices along the path of the transport to selectively enable the transport to interact with the devices; wherein, the transport comprises a tug or locomotive carrying the local computer control means and pulling at least one trolley, each trolley carries platform means, discharge control means, the signal means, and the sensing means, the path of the train comprises a track and the induction and discharge stations are located at spaced locations along the track, and the discharge control means includes at least one tipper arm means, and further including passive discharge actuating means comprising tipping ramp means located on the track near a discharge station, the tipper arm means selectively movable between a non-enabled state in which it cannot engage the tipping ramp means, and an enabled state where it engages the tipping ramp means as the train passes.

8. A system as defined in claim 7, wherein the discharge control means includes a first tipper arm means which causes the platform means to discharge goods to a first side of the track, and a second tipper arm means which causes the platform means to discharge to a second side of the track when it engages the same tipping ramp.

9. A system as defined in claim 8, further including platform sensing means on the transport unit to sense the mode of the platform means.

10. A system as defined in claim 8, wherein the discharge sensing means includes independent discharge sensing means for each tipper arm.

11. A system as defined in claim 8, wherein the discharge control means includes mechanical interlock means associated with the first and second tipper arms, the interlock means responsive to movement of one tipper arm to the enabled state to prevent movement of the other tipper arm to the enabled state.

12. A system as defined in claim 7, wherein the tipping ramp comprises an essentially S-shaped, curved ramp means.

13. A system as defined in claim 12, wherein the tipping ramp means has a height approximating the height of the track.

* * * * *